United States Patent
Lnu et al.

(10) Patent No.: US 12,517,781 B1
(45) Date of Patent: Jan. 6, 2026

(54) STORAGE OF DELAY-LOGIC VALUES FOR ENHANCED FAULT RECOVERY FOR DUAL PROCESSOR LOCK STEP COMPUTING SYSTEMS

(71) Applicant: Ceremorphic, Inc., San Jose, CA (US)

(72) Inventors: Utkarsh Lnu, Bihar (IN); Prakhar Kumar, Uttar Pradesh (IN); Somya Dashora, Rajasthan (IN); Heonchul Park, Pleasanton, CA (US)

(73) Assignee: Ceremorphic, Inc., San Jose, CA (US)

( * ) Notice: Subject to any disclaimer, the term of this patent is extended or adjusted under 35 U.S.C. 154(b) by 226 days.

(21) Appl. No.: 18/238,476

(22) Filed: Aug. 26, 2023

(51) Int. Cl.
*G06F 11/00* (2006.01)
*G06F 11/07* (2006.01)

(52) U.S. Cl.
CPC .................. *G06F 11/0793* (2013.01)

(58) Field of Classification Search
CPC .................................................. G06F 11/0793
USPC ........................................................ 714/1–57
See application file for complete search history.

(56) References Cited

U.S. PATENT DOCUMENTS

| | | | | |
|---|---|---|---|---|
| 6,247,118 B1 * | 6/2001 | Zumkehr | ............ | G06F 11/1405 714/21 |
| 2001/0037445 A1 * | 11/2001 | Mukherjee | .......... | G06F 11/1405 712/216 |
| 2008/0168305 A1 * | 7/2008 | Gschwind | ........... | G06F 11/1405 714/10 |
| 2013/0151819 A1 * | 6/2013 | Piry | ........................ | G06F 9/384 712/E9.023 |
| 2015/0286544 A1 * | 10/2015 | Kadri | .................. | G06F 11/2033 714/13 |
| 2017/0060673 A1 * | 3/2017 | Bowman | ............. | G06F 11/1056 |

OTHER PUBLICATIONS

Sim et al.; A Dual Lockstep Processor System-on-a-Chip for Fast Recovery in Safety Critical Applications; 2020; IEEE (Year: 2020).*
A Dual Lockstep Processor System-on-a-Chip for Fast Error Recovery in Safety Critical Applications (Year: 2020).*

* cited by examiner

*Primary Examiner* — Sarai E Butler
(74) *Attorney, Agent, or Firm* — File-EE-Patents.com; Jay A. Chesavage

(57) ABSTRACT

A computational system with a primary processor and a secondary processor executing executable code, the secondary processor executing at least one clock cycle behind the primary processor. The primary processor comprising (i) two primary delay buffers, including a final primary delay buffer, and (ii) a primary historical storage buffers operably linked to the final primary delay buffer. The secondary processor including a secondary delay buffer and a secondary historical storage buffer operably liked with the secondary delay buffer. The system including a circuit for performing a comparison between first data values from the final primary delay buffer and second data values from the secondary delay buffer. The system configured, if the first data values and the second data values do not match, for storing the first data values in the primary historical storage buffer and the second data values in the secondary historical storage buffer.

20 Claims, 30 Drawing Sheets

← 900

| CYCLE TIME | IF (INST FETCH) | D (DECODE) | EX (EXECUTE) | MEM (MEM ACCESS) | WB (WRITE BACK) |
|---|---|---|---|---|---|
| 1 | INST 1 | | | | |
| 2 | INST 2 | INST 1 | | | |
| 3 | INST 3 | INST 2 | INST 1 | | |
| 4 | INST 4 | INST 3 | INST 2 | INST 1 | |
| 5 | INST 5 | INST 4 | INST 3 | INST 2 | INST 1 |
| 6 | INST 6 | INST 5 | INST 4 | INST 3 | INST 2 |
| 7 | INST 7 | INST 6 | INST 5 | INST 4 | INST 3 |

| CYCLE TIME | IF (INST FETCH) | D (DECODE) | ISSUE | Ex1 (EXECUTE) | EX2 | MEM (MEM ACCESS) | WB (WRITE BACK) |
|---|---|---|---|---|---|---|---|
| 1 | INST 1, INST 2 | | | | | | |
| 2 | INST X1, INST X2 | INST 1, INST 2 | | | | | |
| 3 | INST 3, INST 4 | INST X1, INST X2 | INST 1, INST 2 | | | | |
| 4 | INST X3, INST X4 | INST 3, INST 4 | INST X1, INST X2 | INST 1, INST 2 | | | |
| 5 | INST 5, INST 6 | INST X3, INST X4 | INST 3, INST 4 | INST X1, INST X2 | INST 1, INST 2 | | |
| 6 | INST X5, INST X6 | INST 5, INST 6 | INST X3, INST X4 | INST 3, INST 4 | INST X1, INST X2 | INST 1, INST 2 | |
| 7 | INST 7, INST 8 | INST X5, INST X6 | INST 5, INST 6 | INST X3, INST X4 | INST 3, INST 4 | INST X1, INST X2 | INST 1, INST 2 |
| 8 | INST X7, INST X8 | INST 7, INST 8 | INST X5, INST X6 | INST 5, INST 6 | INST X3, INST X4 | INST 3, INST 4 | INST X1, INST X2 |
| 9 | INST 9, INST 10 | INST X7, INST X8 | INST 7, INST 8 | INST X5, INST X6 | INST 5, INST 6 | INST X3, INST X4 | INST 3, INST 4 |
| 10 | INST X9, INST X10 | INST 9, INST 10 | INST X7, INST X8 | INST 7, INST 8 | INST X5, INST X6 | INST 5, INST 6 | INST X3, INST X4 |
| | | | | | | | |
| | | | | | | | |
| | inst $i$ | Thread 0 instruction | | | | | |
| | inst $Xi$ | Thread 1 instruction | | | | | |

| CPU-0 CYCLE TIME | IF (INST FETCH) | D (DE-CODE) | Ex (EX-ECUTE) | MEM (MEM ACCESS) | DELAY1 | DELAY2 | DELAY3 | WB (WRITE BACK) |
|---|---|---|---|---|---|---|---|---|
| 1 | INST 1 | | | | | | | |
| 2 | INST 2 | INST 1 | | | | | | |
| 3 | INST 3 | INST 2 | INST 1 | | | | | |
| 4 | INST 4 | INST 3 | INST 2 | INST 1 | | | | |
| 5 | INST 5 | INST 4 | INST 3 | INST 2 | INST 1 | | | |
| 6 | INST 6 | INST 5 | INST 4 | INST 3 | INST 2 | INST 1 | | |
| 7 | INST 7 | INST 6 | INST 5 | INST 4 | INST 3 | INST 2 | INST 1 | |
| 8 | INST 8 | INST 7 | INST 6 | INST 5 | INST 4 | INST 3 | INST 2 | INST 1 |
| 9 | INST 9 | INST 8 | INST 7 | INST 6 | INST 5 | INST 4 | INST 3 | INST 2 |
| 10 | INST 10 | INST 9 | INST 8 | INST 7 | INST 6 | INST 5 | INST 4 | INST 3 |
| 11 | INST 11 | INST 10 | INST 9 | INST 8 | INST 7 | INST 6 | INST 5 | INST 4 |
| 12 | INST 12 | INST 11 | INST 10 | INST 9 | INST 8 | INST 7 | INST 6 | INST 5 |

| CPU-1 CYCLE TIME | IF (INST FETCH) | D (DE-CODE) | Ex (EX-ECUTE) | MEM (MEM ACCESS) | DELAY1 | WB (WRITE BACK) |
|---|---|---|---|---|---|---|
| 1 | | | | | | |
| 2 | | | | | | |
| 3 | INST 1 | | | | | |
| 4 | INST 2 | INST 1 | | | | |
| 5 | INST 3 | INST 2 | INST 1 | | | |
| 6 | INST 4 | INST 3 | INST 2 | INST 1 | | |
| 7 | INST 5 | INST 4 | INST 3 | INST 2 | INST 1 | |
| 8 | INST 6 | INST 5 | INST 4 | INST 3 | INST 2 | INST 1 |
| 9 | INST 7 | INST 6 | INST 5 | INST 4 | INST 3 | INST 2 |
| 10 | INST 8 | INST 7 | INST 6 | INST 5 | INST 4 | INST 3 |
| 11 | INST 9 | INST 8 | INST 7 | INST 6 | INST 5 | INST 4 |
| 12 | INST 10 | INST 9 | INST 8 | INST 7 | INST 6 | INST 5 |
| 13 | INST 11 | INST 10 | INST 9 | INST 8 | INST 7 | INST 6 |
| 14 | INST 12 | INST 11 | INST 10 | INST 9 | INST 8 | INST 7 |

| CPU-0 CYCLE TIME | IF (INST FETCH) | D (DE-CODE) | ISSUE | Ex1 (EX-ECUTE) | EX2 | MEM (MEM ACCESS) | DELAY1 | DELAY2 | DELAY3 | WB (WRITE BACK) |
|---|---|---|---|---|---|---|---|---|---|---|
| 1 | INST 1, INST 2 | | | | | | | | | |
| 2 | INST X1, INST X2 | INST 1, INST 2 | | | | | | | | |
| 3 | INST 3, INST 4 | INST X1, INST X2 | INST 1, INST 2 | | | | | | | |
| 4 | INST X3, INST X4 | INST 3, INST 4 | INST X1, INST X2 | INST 1, INST 2 | | | | | | |
| 5 | INST 5, INST 6 | INST X3, INST X4 | INST 3, INST 4 | INST X1, INST X2 | INST 1, INST 2 | | | | | |
| 6 | INST X5, INST X6 | INST 5, INST 6 | INST X3, INST X4 | INST 3, INST 4 | INST X1, INST X2 | INST 1, INST 2 | | | | |
| 7 | INST 7, INST 8 | INST X5, INST X6 | INST 5, INST 6 | INST X3, INST X4 | INST 3, INST 4 | INST X1, INST X2 | INST 1, INST 2 | | | |
| 8 | INST X7, INST X8 | INST 7, INST 8 | INST X5, INST X6 | INST 5, INST 6 | INST X3, INST X4 | INST 3, INST 4 | INST X1, INST X2 | INST 1, INST 2 | | |
| 9 | INST 9, INST 10 | INST X7, INST X8 | INST 7, INST 8 | INST X5, INST X6 | INST 5, INST 6 | INST X3, INST X4 | INST 3, INST 4 | INST X1, INST X2 | INST 1, INST 2 | |
| 10 | INST X9, INST X10 | INST 9, INST 10 | INST X7, INST X8 | INST 7, INST 8 | INST X5, INST X6 | INST 5, INST 6 | INST X3, INST X4 | INST 3, INST 4 | INST X1, INST X2 | INST 1, INST 2 |
| 11 | | | | | | | | | | |
| 12 | | | | | | | | | | |
| 13 | | | | | | | | | | |
| 14 | | | | | | | | | | |

FIG. 12A

| CPU-1 CYCLE TIME | IF (INST FETCH) | D (DECODE) | ISSUE | Ex1 (EXECUTE) | EX2 | MEM (MEM ACCESS) | DELAY1 | WB (WRITE BACK) |
|---|---|---|---|---|---|---|---|---|
| 1 | | | | | | | | |
| 2 | | | | | | | | |
| 3 | INST 1, INST 2 | | | | | | | |
| 4 | INST 3, INST 4 | INST 1, INST 2 | | | | | | |
| 5 | INST 5, INST 6 | INST 3, INST 4 | INST 1, INST 2 | | | | | |
| 6 | INST 7, INST 8 | INST 5, INST 6 | INST 3, INST 4 | INST 1, INST 2 | | | | |
| 7 | INST 9, INST 10 | INST 7, INST 8 | INST 5, INST 6 | INST 3, INST 4 | INST 1, INST 2 | | | |
| 8 | INST 11, INST 12 | INST 9, INST 10 | INST 7, INST 8 | INST 5, INST 6 | INST 3, INST 4 | INST 1, INST 2 | | |
| 9 | INST 13, INST 14 | INST 11, INST 12 | INST 9, INST 10 | INST 7, INST 8 | INST 5, INST 6 | INST 3, INST 4 | INST 1, INST 2 | |
| 10 | INST 15, INST 16 | INST 13, INST 14 | INST 11, INST 12 | INST 9, INST 10 | INST 7, INST 8 | INST 5, INST 6 | INST 3, INST 4 | INST 1, INST 2 |
| 11 | INST 17, INST 18 | INST 15, INST 16 | INST 13, INST 14 | INST 11, INST 12 | INST 9, INST 10 | INST 7, INST 8 | INST 5, INST 6 | INST 3, INST 4 |
| 12 | INST 19, INST 20 | INST 17, INST 18 | INST 15, INST 16 | INST 13, INST 14 | INST 11, INST 12 | INST 9, INST 10 | INST 7, INST 8 | INST 5, INST 6 |

| FIG. 13A | FIG. 13B |
|---|---|
| FIG. 13C | FIG. 13D |

FIG. 13

| CPU-0 CYCLE TIME | IF (INST FETCH) | D (DE-CODE) | ISSUE | Ex1 (EX-ECUTE) | EX2 | MEM (MEM ACCESS) | DELAY1 | DELAY2 | DELAY3 | WB (WRITE BACK) |
|---|---|---|---|---|---|---|---|---|---|---|
| 1 | INST 1, INST 2 | | | | | | | | | |
| 2 | INST X1, INST X2 | INST 1, INST 2 | | | | | | | | |
| 3 | INST 3, INST 4 | INST X1, INST X2 | INST 1, INST 2 | | | | | | | |
| 4 | INST X3, INST X4 | INST 3, INST 4 | INST X1, INST X2 | INST 1, INST 2 | | | | | | |
| 5 | INST 5, INST 6 | INST X3, INST X4 | INST 3, INST 4 | INST X1, INST X2 | INST 1, INST 2 | | | | | |
| 6 | INST X5, INST X6 | INST 5, INST 6 | INST X3, INST X4 | INST 3, INST 4 | INST X1, INST X2 | INST 1, INST 2 | | | | |
| 7 | INST 7, INST 8 | INST X5, INST X6 | INST 5, INST 6 | INST X3, INST X4 | INST 3, INST 4 | INST X1, INST X2 | INST 1, INST 2 | | | |
| 8 | INST X7, INST X8 | INST 7, INST 8 | INST X5, INST X6 | INST 5, INST 6 | INST X3, INST X4 | INST 3, INST 4 | INST X1, INST X2 | INST 1, INST 2 | | |
| 9 | INST 9, INST 10 | INST X7, INST X8 | INST 7, INST 8 | INST X5, INST X6 | INST 5, INST 6 | INST X3, INST X4 | INST 3, INST 4 | INST X1, INST X2 | INST 1, INST 2 | |
| 10 | INST X9, INST X10 | INST 9, INST 10 | INST X7, INST X8 | INST 7, INST 8 | INST X5, INST X6 | INST 5, INST 6 | INST X3, INST X4 | INST 3, INST 4 | INST X1, INST X2 | INST 1, INST 2 |
| 11 | | | | | | | | | | |
| 12 | | | | | | | | | | |
| 13 | | | | | | | | | | |
| 14 | | | | | | | | | | |

FIG. 13A

| CIRCULAR BUFFER 1 | | | | | | |
|---|---|---|---|---|---|---|
| 1 | | | | | | |
| 2 | | | | | | |
| 3 | | | | | | |
| 4 | V,INST 1 OP, PC, DEST//V, INST 2 OP, PC, DEST | | | | | |
| 5 | | V, INST 1 OP, PC DEST//V, INST 2 OP, PC, DEST | | | | |
| 6 | | | V, INST1 OP, PC, DEST VALUE//V, INST 2 OP, PC, DEST, DEST VALUE//V, INST 3 OP, PC, DEST//V, inst4 OP, PC, dest | | | |
| 7 | | | | V, INST1 OP, PC, DEST, DEST VALUE // V, INST 2 OP, PC, DEST, DEST VALUE//V, INST 3 OP, PC, DEST// V, INST4 OP, PC, DEST | | |
| 8 | | | | | V, INST 2 OP, PC, DEST, DEST VALUE//V, INST 3 OP, PC, DEST, DEST VALUE//V, INST4 OP, PC, DEST, DEST VALUE //V INST5 OP, PC, DEST // V INST 6 OP, PC, DEST | |
| 9 | | | | | | V, INST 3 OP, PC, DEST, DEST VALUE//V, INST4 OP, PC, DEST, DEST VALUE//V INST5 OP, PC, DEST, DEST VALUE // V INST 6 OP, PC, DEST, DEST VALUE // V INST 7 OP, PC, DEST // V INST 8 OP, PC, DEST |
| 10 | | | | | | |

FIG. 13B

| CPU-1 CYCLE TIME | IF (INST FETCH) | D (DECODE) | EX (EXECUTE) | MEM (MEM ACCESS) | DELAY 1 | WB (WRITE BACK) |
|---|---|---|---|---|---|---|
| 1 | | | | | | |
| 2 | | | | | | |
| 3 | INST 1 | | | | | |
| 4 | INST 2 | INST 1 | | | | |
| 5 | INST 3 | INST 2 | INST 1 | | | |
| 6 | INST 4 | INST 3 | INST 2 | INST 1 | | |
| 7 | INST 5 | INST 4 | INST 3 | INST 2 | INST 1 | |
| 8 | INST 6 | INST 5 | INST 4 | INST 3 | INST 2 | INST 1 |
| 9 | INST 7 | INST 6 | INST 5 | INST 4 | INST 3 | INST 2 |
| 10 | INST 8 | INST 7 | INST 6 | INST 5 | INST 4 | INST 3 |
| 11 | INST 9 | INST 8 | INST 7 | INST 6 | INST 5 | INST 4 |
| 12 | INST 10 | INST 9 | INST 8 | INST 7 | INST 6 | INST 5 |
| 13 | INST 11 | INST 10 | INST 9 | INST 8 | INST 7 | INST 6 |
| 14 | INST 12 | INST 11 | INST 10 | INST 9 | INST 8 | INST 7 |

| | | | | | |
|---|---|---|---|---|---|
| 1 | CIRCULAR BUFFER 2 | | | | |
| 2 | | | | | |
| 3 | | | | | |
| 4 | | | | | |
| 5 | V INST 1 OP, PC, DEST | | | | |
| 6 | | V INST1 OP, PC, DEST, DEST VALUE \\V INST2 OP, PC, DEST | | | |
| 7 | | | V INST 1 OP, PC, DEST, DEST VALUE \\V INST 2 OP, PC, DEST, DEST VALUE \\ V INST3 OP, PC, DEST | | |
| 8 | | | | V INST 2 OP, PC, DEST, DEST VALUE \\V INST 3 OP, PC, DEST, DEST VALUE \\ V INST 4 OP, PC, DEST | |
| 9 | | | | | V INST 3 OP, PC, DEST, DEST VALUE \\V INST 4 OP, PC, DEST, DEST VALUE \\ V INST 5 OP, PC, DEST |
| 10 | | | | | |
| 11 | | | | | |
| 12 | | | | | |
| 13 | | | | | |
| 14 | | | | | |

FIG. 13D

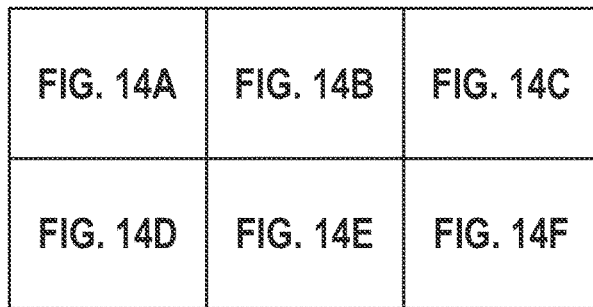

| CPU-0 CYCLE TIME | IF (INST FETCH) | D (DECODE) | ISSUE | Ex1 (EXECUTE) | EX2 | MEM (MEM ACCESS) | DELAY1 | DELAY2 | DELAY3 | WB (WRITE BACK) |
|---|---|---|---|---|---|---|---|---|---|---|
| 1 | INST 1, INST 2 | | | | | | | | | |
| 2 | INST X1, INST X2 | INST 1, INST 2 | | | | | | | | |
| 3 | INST 3, INST 4 | INST X1, INST X2 | INST 1, INST 2 | | | | | | | |
| 4 | INST X3, INST X4 | INST 3, INST 4 | INST X1, INST X2 | INST 1, INST 2 | | | | | | |
| 5 | INST 5, INST 6 | INST X3, INST X4 | INST 3 | INST X1, INST X2 | INST 1, INST 2 | | | | | |
| 6 | INST X5, INST X6 | INST 4, INST 5 | INST X3, INST X4 | INST 3 | INST X1, INST X2 | INST 1, INST 2 | | | | |
| 7 | INST 6 | INST X5, INST X6 | INST 4 | INST X3, INST X4 | INST 3 | INST X1, INST X2 | INST 1, INST 2 | | | |
| 8 | INST X7, INST X8 | INST 5, INST 6 | INST X5, INST X6 | INST 4 | INST X3, INST X4 | INST 3 | INST X1, INST X2 | INST 1, INST 2 | | |
| 9 | INST 7, INST 8 | INST X7, INST X8 | INST 5 | INST X5, INST X6 | INST 4 | INST X3, INST X4 | INST 3 | INST X1, INST X2 | INST 1, INST 2 | |
| 10 | INST X9, INST X10 | INST 7, INST 8 | INST X7, INST X8 | INST 5 | INST X5, INST X6 | INST 4 | INST X3, INST X4 | INST 3 | INST X1, INST X2 | INST 1, INST 2 |
| 11 | INST 8, INST 9 | INST X9, INST X10 | INST 6, INST 7 | INST X7, INST X8 | INST 5 | INST X5, INST X6 | INST 4 | INST X3, INST X4 | INST 3 | INST X1, INST X2 |
| 12 | INST X11, INST X12 | INST 8, INST 9 | INST X9, INST X10 | INST 6, INST 7 | INST X7, INST X8 | INST 5 | INST X5, INST X6 | INST 4 | INST X3, INST X4 | INST 3 |
| 13 | | | | | | | | | | |
| 14 | | | | | | | | | | |

FIG. 14A

| CIRCULAR BUFFER 1 | | | | | |
|---|---|---|---|---|---|
| 1 | | | | | |
| 2 | | | | | |
| 3 | | | | | |
| 4 | V,INST 1 OP, PC, DEST//V, INST 2 OP, PC, DEST | | | | |
| 5 | | V, INST 1 OP, PC DEST//V, INST 2 OP, PC, DEST | | | |
| 6 | | | V, INST1 OP, PC, DEST VALUE/V, INST 2 OP, PC, DEST, DEST VALUE//V, INST 3 OP, PC, DEST | | |
| 7 | | | | V, INST 1 OP, PC, DEST, DEST VALUE// V, INST 2 OP, PC, DEST, DEST VALUE// V, INST3 OP, PC, DEST | |
| 8 | | | | | V, INST 2 OP, PC, DEST DEST VALUE// V, INST 3 OP, PC, DEST, DEST VALUE// V, INST4 OP, PC, DEST |

FIG. 14B

| CIRCULAR BUFFER 1 | | | | | | | | | |
|---|---|---|---|---|---|---|---|---|---|
| 9 | | | | | | V. INST 3 OP, PC, DEST, DEST VALUE// V. INST4 OP, PC, DEST | | | |
| 10 | | | | | | | V. INST4 OP, PC, DEST, DEST VALUE//V INST5 OP, PC, DEST | | |
| 11 | | | | | | | | V INST5 OP, PC, DEST | |
| 12 | | | | | | | | | V INST 5 OP, PC, DEST, DEST VALUE\\V INST 6 OP, PC, DEST\\V INST 7 OP, PC, DEST |
| 13 | | | | | | | | | |

| CPU-1 CYCLE TIME | IF (INST FETCH) | D (DECODE) | EX (EXECUTE) | MEM (MEM ACCESS) | DELAY 1 | WB (WRITE BACK) | |
|---|---|---|---|---|---|---|---|
| 1 | | | | | | | |
| 2 | | | | | | | |
| 3 | INST 1 | | | | | | |
| 4 | INST 2 | INST 1 | | | | | |
| 5 | INST 3 | INST 2 | INST 1 | | | | |
| 6 | INST 4 | INST 3 | INST 2 | INST 1 | | | |
| 7 | INST 5 | INST 4 | INST 3 | INST 2 | INST 1 | | |
| 8 | INST 6 | INST 5 | INST 4 | INST 3 | INST 2 | INST 1 | |
| 9 | INST 7 | INST 6 | INST 5 | INST 4 | INST 3 | INST 2 | |
| 10 | INST 8 | INST 7 | INST 6 | INST 5 | INST 4 | INST 3 | |
| 11 | INST 9 | INST 8 | INST 7 | INST 6 | INST 5 | INST 4 | |
| 12 | INST 9 | INST 8 | INST 7 | INST 6 | INST 5 | INST 4 | PIPELINE STALL |
| 13 | INST 10 | INST 9 | INST 8 | INST 7 | INST 6 | INST 5 | |
| 14 | INST 11 | INST 10 | INST 9 | INST 8 | INST 7 | INST 6 | |
| 15 | INST 12 | INST 11 | INST 10 | INST 9 | INST 8 | INST 7 | |

FIG. 14D

| CIRCULAR BUFFER 2 | | | | | | |
|---|---|---|---|---|---|---|
| 1 | | | | | | |
| 2 | | | | | | |
| 3 | | | | | | |
| 4 | | | | | | |
| 5 | V INST 1 OP, PC, DEST | | | | | |
| 6 | | V INST1 OP, PC, DEST, DEST VALUE \\ V INST2 OP, PC, DEST | | | | |
| 7 | | | V INST 1 OP, PC, DEST, DEST VALUE \\ V INST 2 OP, PC, DEST, DEST VALUE \\ V INST3 OP, PC, DEST | | | |
| 8 | | | | V INST 2 OP, PC, DEST, DEST VALUE \\ V INST 3 OP, PC, DEST, DEST VALUE \\ V INST 4 OP, PC, DEST | | |
| 9 | | | | | V INST 3 OP, PC, DEST, DEST VALUE \\ V INST 4 OP, PC, DEST, DEST VALUE \\ V INST 5 OP, PC, DEST | |
| 10 | | | | | | V INST 4 OP, PC, DEST, DEST VALUE \\ V INST 5 OP, PC, DEST, DEST VALUE \\ V INST 6 OP, DEST |

| CPU-0 CYCLE TIME | IF (INST FETCH) | D (DECODE) | ISSUE | Ex1 (EXECUTE) | EX2 | MEM (MEM ACCESS) | DELAY1 | DELAY2 | DELAY3 | WB (WRITE BACK) |
|---|---|---|---|---|---|---|---|---|---|---|
| 1 | INST 1, INST 2 | | | | | | | | | |
| 2 | INST X1, INST X2 | INST 1, INST 2 | | | | | | | | |
| 3 | INST 3, INST 4 | INST X1, INST X2 | INST 1, INST 2 | | | | | | | |
| 4 | INST X3, INST X4 | INST 3, INST 4 | INST X1, INST X2 | INST 1, INST 2 | | | | | | |
| 5 | INST 5, INST 6 | INST X3, INST X4 | INST 3 | INST X1, INST X2 | INST 1, INST 2 | | | | | |
| 6 | INST X5, INST X6 | INST 4, INST 5 | INST X3, INST X4 | INST 3 | INST X1, INST X2 | INST 1, INST 2 | | | | |
| 7 | INST 6 | INST X5, INST X6 | INST 4 | INST X3, INST X4 | INST 3 | INST X1, INST X2 | INST 1, INST 2 | | | |
| 8 | INST X7, INST X8 | INST 5, INST 6 | INST X5, INST X6 | INST 4 | INST X3, INST X4 | INST 3 | INST X1, INST X2 | INST 1, INST 2 | | |
| 9 | /// | INST X7, INST X8 | /// | INST X5, INST X6 | /// | INST X3, INST X4 | /// | INST X1, INST X2 | INST 1 | |
| 10 | INST X9, INST X10 | /// | INST X7, INST X8 | /// | INST X5, INST X6 | /// | INST X3, INST X4 | /// | INST X1, INST X2 | INST 1 |
| 11 | INST 2, INST 3 | INST X9, INST X10 | /// | INST X7, INST X8 | /// | INST X5, INST X6 | /// | INST X3, INST X4 | /// | INST X1, INST X2 |
| 12 | INST X11, INST X12 | INST 2, INST 3 | INST X9, INST X10 | /// | INST X7, INST X8 | /// | INST X5, INST X6 | /// | INST X3, INST X4 | /// |
| 13 | | | INST 2, INST 3 | INST X9, INST X10 | /// | INST X7, INST X8 | /// | INST X5, INST X6 | /// | INST X3, INST X4 |
| 14 | | | | INST 2, INST 3 | INST X9, INST X10 | /// | INST X7, INST X8 | /// | INST X5, INST X6 | /// |
| | | | | | INST 2, INST 3 | INST X9, INST X10 | /// | INST X7, INST X8 | /// | INST X5, INST X6 |
| | | | | | | INST 2, INST 3 | INST X9, INST X10 | /// | INST X7, INST X8 | /// |
| | | | | | | | INST 2, INST 3 | INST X9, INST X10 | /// | INST X7, INST X8 |
| | | | | | | | | INST 2, INST 3 | INST X9, INST X10 | /// |
| | | | | | | | | | INST 2, INST 3 | INST X9, INST X10 |
| | | | | | | | | | | INST 2, INST 3 |

FIG. 15A

| CIRCULAR BUFFER 1 | | | | | |
|---|---|---|---|---|---|
| 1 | | | | | |
| 2 | | | | | |
| 3 | | | | | |
| 4 | V,INST 1 OP, PC, DEST/V, INST 2 OP, PC, DEST | | | | |
| 5 | | V, INST 1 OP, PC DEST/V , INST 2 OP, PC, DEST | | | |
| 6 | | | V, INST1 OP, PC, DEST VALUE/V, INST 2 OP, PC, DEST, DEST VALUE/V, INST 3 OP, PC, DEST | | |
| 7 | | | | V, INST 1 OP, PC, DEST, DEST VALUE/V, INST 2 OP, PC, DEST, DEST VALUE/V, INST 3 OP, PC, DEST | |
| 8 | | | | | MISMATCH: V, INST 2 OP, PC, DEST, DEST VALUE/V, INST 3 OP, PC, DEST, DEST VALUE/V, INST 4 OP, PC, DSET |
| 9 | | | | | |
| 10 | | | | | |
| 11 | | | | | |
| 12 | | | | | |
| 13 | | | | | |
| 14 | | | | | | V, INST2 OP, PC, DEST\V , INST 3OP, PC, DEST |
| 15 | | | | | |

| CPU-1 CYCLE TIME | IF (INST FETCH) | D (DECODE) | EX (EXECUTE) | MEM (MEM ACCESS) | DELAY 1 | WB (WRITE BACK) |
|---|---|---|---|---|---|---|
| 1 | | | | | | |
| 2 | | | | | | |
| 3 | INST 1 | | | | | |
| 4 | INST 2 | INST 1 | | | | |
| 5 | INST 3 | INST 2 | INST 1 | | | |
| 6 | INST 4 | INST 3 | INST 2 | INST 1 | | |
| 7 | INST 5 | INST 4 | INST 3 | INST 2 | INST 1 | |
| 8 | INST 6 | INST 5 | INST 4 | INST 3 | INST 2 | INST 1 |
| 9 | | | | | | |
| 10 | INST 2 | | | | | |
| 11 | INST 3 | INST 2 | | | | |
| 12 | INST 4 | INST 3 | INST 2 | | | |
| 13 | INST 5 | INST 4 | INST 3 | INST 2 | | |
| 14 | INST 6 | INST 5 | INST 4 | INST 3 | INST 2 | |
| 15 | INST 7 | INST 6 | INST 5 | INST 4 | INST 3 | INST 2 |

FIG. 15C

| CIRCULAR BUFFER 2 | | | | | | |
|---|---|---|---|---|---|---|
| 1 | | | | | | |
| 2 | | | | | | |
| 3 | | | | | | |
| 4 | | | | | | |
| 5 | V INST 1 OP, PC, DEST | | | | | |
| 6 | | V INST1 OP, PC, DEST, DEST VALUE\\V INST2 OP, PC, DEST | | | | |
| 7 | | | V INST 1 OP, PC, DEST, DEST VALUE \\V INST 2 OP, PC, DEST, DEST VALUE \\ V INST3 OP, PC, DEST | | | |
| 8 | | | | MISMATCH: V INST 2 OP, PC, DEST, DEST VALUE \\V INST 3 OP, PC, DEST, DEST VALUE \\ V INST 4 OP, PC, DEST | | |
| 9 | | | | | | |
| 10 | | | | | | |
| 11 | | | | | | |
| 12 | | | | | V INST2 OP, PC, DEST | |
| 13 | | | | | | V INST2 OP, PC, DEST, DEST VALUE\\ V INST3 OP, PC, DEST |
| 14 | | | | | | |
| 15 | | | | | | |

STORAGE OF DELAY-LOGIC VALUES FOR ENHANCED FAULT RECOVERY FOR DUAL PROCESSOR LOCK STEP COMPUTING SYSTEMS

TECHNICAL FIELD

Embodiments described in this document relate to the storage of delay-logic values for enhanced fault recovery for dual processor lock step computing systems. Some further embodiments relate to storing of data in delay logic storage of at least two iterations of delay-logic values for enhanced fault recovery for dual processor lock step computing systems.

BACKGROUND

Microprocessors and their systems can have a fault during operation. These faults can happen for various known and unknown reasons. Faults may be classified as transient or permanent faults. A transient fault is a temporary fault in a circuit. A transient fault may last for a very short period of time, after which the circuit works properly. Common causes of transient faults in computing systems include radiation, interference, power supply fluctuations, clock or synchronization issues, or network or communication errors. While the transient fault is only temporary, in some instances transient faults can cause computing errors, such as incorrect results, which may then be propagated to other parts of the circuit. This propagation may lead to more persistent problems. In other instances, a transient fault may produce a fault result that disappears without harm to the system.

If a transient fault is detected, the computing system may respond with a system rollback that restarts a program from a known clean point, also known as a checkpoint. With the restart from the known clean point, the computing system recovers, although with some time delays.

In contrast to a transient fault, a permanent fault occurs when a circuit of a computing system is defective, damaged, or broken. A computing system cannot recover from a permanent fault without assistance from human users or a higher level system. While a permanent fault persists, the defective, damaged, or broken circuit cannot be used. Once a permanent fault is detected, one option is to replace the defective, damaged, or broken circuit. Another option is to operate the computer system but to avoid using the circuit that is defective, damaged, or broken.

SUMMARY

This summary is provided for the convenience of the reader. In some embodiments, a computational system includes at least a primary processor configured to execute executable code, including at least updating at least one of a first register file (first ARF) or a memory, the primary processor including at least: (i) two or more primary processor delay buffers, including at least one final primary processor delay buffer that is last in a sequence of at least some of the two or more primary processor delay stages; and (ii) one or more primary processor historical storage buffers communicatively coupled with the at least one final primary processor delay buffer.

The computational system further includes at least a secondary processor configured to execute the executable code one or more clock cycles behind the primary processor, including at least updating at least one of a second register file (second ARF) or the memory, the secondary processor including at least: (i) one or more secondary processor delay buffers; and (ii) one or more secondary processor historical storage buffers communicatively coupled with the one or more secondary processor delay buffers.

The computational system further includes at least comparator circuitry configured for determining if there is a match between one or more first data values from the at least one final primary processor delay buffer and one or more second data values from the one or more secondary processor delay buffers, the lack of a match being indicative of a fault.

And, the computational system further includes at least wherein, responsive to a fault, the primary processor is configured to store the one or more first data values in the at least one primary processor historical storage buffer and the secondary processor is configured to store the one or more second data values in the at least one secondary processor historical storage buffer.

BRIEF DESCRIPTION OF DRAWINGS

Representative embodiments are illustrated by way of example and not by limitation in the accompanying figures, in which:

FIG. 9 is a pipeline timing diagram illustrating the execution of instructions in a pipeline of a 5-stage processor.

FIG. 10 is a pipeline timing diagram illustrating the execution of instructions in a pipeline of a 7-stage processor.

FIGS. 11A and 11B are pipeline timing diagrams illustrating the execution of instructions in a pipeline of a primary 5-stage processor (CPU-0) and of a secondary 5-stage processor (CPU-1), both operating in a reliability mode, consistent with some embodiments.

FIGS. 12A and 12B are pipeline timing diagrams illustrating the execution of instructions in a pipeline of a primary 7-stage processor (CPU-0) and of a secondary 7-stage processor CPU (CPU-1), both operating in a reliability mode, consistent with some embodiments.

FIG. 13 is a chart illustrating how to arrange FIGS. 13A-13D.

FIGS. 13A-13D are charts illustrating the execution of instructions in a pipeline of a primary processor (CPU-0) and use of a circular buffer related to the primary processor. Also illustrated is the execution of instructions in a pipeline of a secondary processor (CPU-1) and use of a circular buffer related to the secondary processor. The two processor's operating in reliability mode with the circular buffers for synchronization.

FIG. 14 is a chart illustrating how to arrange FIGS. 14A-14F.

FIGS. 14A-14F are charts illustrating the execution of instructions in pipelines and the use of circular buffers related to a primary processor (CPU-0) and a secondary processor (CPU-1), the two processor's operating in reliability mode with the circular buffer. Shown is pipeline behavior for synchronization of the primary processor and the secondary processor.

FIG. 15 is a chart illustrating how to arrange FIGS. 15A-15D.

FIGS. 15A-15D are charts illustrating the execution of instructions in pipelines and the use of circular buffers related to a primary processor (CPU-0) and a secondary processor (CPU-1), the two processor's operating in reliability mode with the circular buffer. Shown is pipeline behavior where a comparator finds a mismatch between the primary processor and the secondary processor.

DETAILED DESCRIPTION

Figure 1:
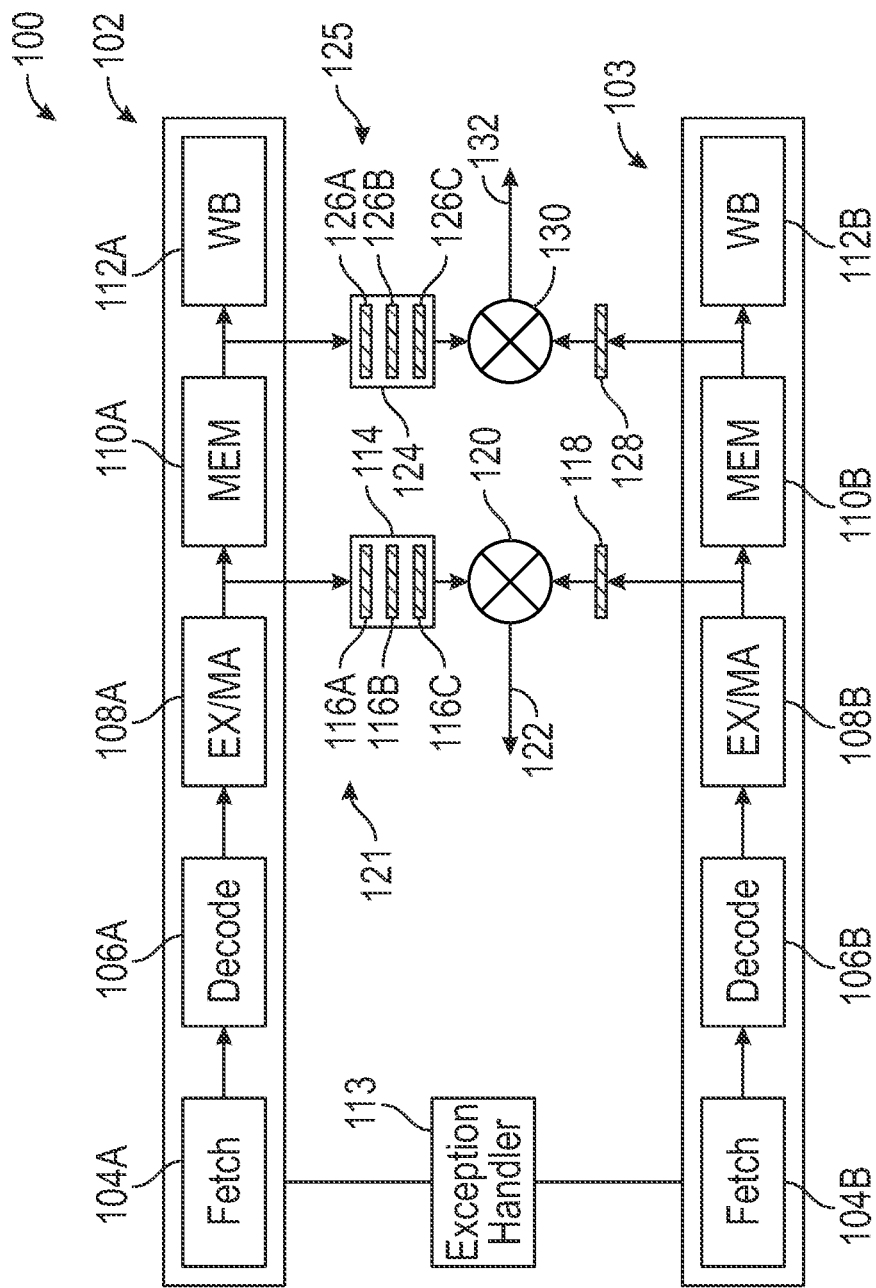
FIG. 1 is a simplified block diagram of an exemplary dual processor lock step (DCLS) system, showing a primary processor and a secondary processor.

In the above-described drawings, certain features are simplified to avoid obscuring the pertinent features with extraneous details. The above drawings are not necessarily to scale. It is to be understood that the disclosed embodiments are merely exemplary of the invention, which may be embodied in various forms. It is also to be understood that multiple references to "some embodiments" are not necessarily referring to the same embodiments.

Part A

This application now discloses various embodiments related to fault detection and responding to detected faults. The fault detection and the response to a detected fault are performed with a reliability mode. Before proceeding to details of a reliability mode, some introductory subject matter is disclosed.

When a fault occurs, whether transitory or permanent, it is possible that an output was incorrect. Thus, it is important to detect faults. For fault tolerance applications such as automotive or aerospace applications, Triple Module Redundancy (TMR) or dual processor lock step (DCLS) are frequently employed to detect and avoid the fault. Although these mechanisms are very expensive approaches, they are nonetheless very useful mechanisms for detecting faults and for avoiding critical failures.

TMR is the most expensive approach. In a conventional TMR three identical hardware processors execute the same program and compare results. If the results are different (in a transient fault), then majority data based on the voting of the three hardware processors is used to update the next step. If all three results are inconsistent or if the three results are incorrect and not able to be corrected, then execution jumps to a known clean point and begins the program begins again. A second fault generally indicates a permanent fault. If a permanent fault is detected, then the system decides if it will operate with non-faulty parts only or not to operate until the part is replaced.

A conventional DCLS uses two identical processors. Each processor executes the same software but executes a few clock cycles apart as common mode failure mitigation. Some internal key signals or key boundary signals are compared continuously. If the comparison does not match then this causes a system call. After the system call the system status jumps to the known clean point and the system executes the program again. Since there are two processors in the system, the mismatch between these two processors can detect a fault, but the system cannot determine which processor is correct. During execution, the known clean point has to be updated periodically as the program makes progress. Updating the known clean point requires a significant amount of processor cycles.

In this document, some embodiments are disclosed for DCLS systems that utilize historical storage buffers to store data values associated with faults. For example, in an exemplary DCLS system a primary processor and a secondary processor both execute the same executable code, the secondary processor executing one or more clock cycles behind the primary processor. The exemplary DCLS system includes a comparator to compare data values from delay circuitry in the primary processor with data values from delay circuitry in the secondary processor. When a DCLS system detects a first fault during execution of the executable code, certain actions are taken. These actions include storing the compared data values in a first stage historical storage buffer in the primary processor and in a first stage historical storage buffer in the secondary processor.

If, during a re-execution of the executable code, the comparator again detects a second fault based on comparison of additional data values from the delay circuitry in the primary processor with additional data values from delay circuitry in the secondary processor, additional action is taken. This additional action includes coping the data values associated with the first fault from the first stage historical storage buffers to second stage historical storage buffers. And the data values associated with the second fault are copied into the first historical data storage buffers. Other details are discussed below in reference to the drawings.

Referencing FIG. 1, an exemplary dual processor lock step (DCLS) system 100 includes a primary processor 102 and a secondary processor 103. Both primary processor 102 and secondary processor 103 are configured to execute the same program, but with primary processor 102 executing a fixed number of clock cycles (for example, two clock cycles) ahead of secondary processor 103. In this exemplary DCLS system, the fixed clock cycle separation facilitates a comparator which, as discussed below, compares signals from the two processors for purposes of fault detection.

The primary processor 102 and the secondary processor 103 have separate but identical instruction pipelines that include fetch states 104A, 104B, decode stages 106A, 106B, execution/memory address generation stages 108A, 108B, memory access/store stages 110A, 110B, and write back stages 112A, 112B.

Fetch stages 104A, 104B read instructions from instruction memory (e.g. an instruction cache). Decode stages 106A, 106B perform the instruction decoding, such as for example, parsing instructions, determining register sources for operands, determining the types of operations, and determining destinations for output. The execution/memory address calculation stages 108A, 108B (EX/MA) perform actual operations based on operands from Decode stages 106A, 106B and operand type. The execution/memory address calculation stages 108A, 108B also calculate memory addresses if an operation type was identified in the decode stages 106A, 106B as a load/store instruction. Memory access/store stages 110A, 110B (MEM) access data memory for reading from memory or storing to memory. The write-back stages 112A, 112B (WB) stores load data obtained from a read operation and from data generated from instruction pipeline operations into a register file.

Continuing with reference to FIG. 1, DCLS system 100 further includes (after the execution/memory address calculation stages 108A, 108B but before the memory access/store stages 110A, 110B) some store data comparison structures 121. These store data comparison structures 121 include primary processor store data delay circuit 114 which includes, operably connected in sequence, primary processor store data delay circuit stage 1 116A (e.g. a flip-flop), primary processor store data delay circuit stage 2 116B (e.g. a flip-flop), and primary processor store data delay circuit stage 3 116C (e.g. a flip-flop). The store data comparison structures 121 further include secondary processor store data store data delay circuit 118, which in this example system has a single stage (e.g. a flip-flop). Primary processor store data delay circuit 114 and secondary processor store data delay circuit 118 are both operably connected to output to store data comparator 120, which is configured to compare the respective signals of primary processor store data delay circuit 114 (e.g. from primary processor core store data delay circuit stage 3 116C) and secondary processor store data delay circuit 118. Store data comparator 120 outputs store data comparison results 122 indicating a match or no match.

DCLS system 100 further includes (after the memory access/store stages 110A, 110B but before the write-back stages 112A, 112B) some write-back data comparison structures 125. These write-back data comparison structures 125 include primary processor write-back delay circuit 124 which includes, operably connected in sequence, primary processor write-back delay circuit stage 1 126A (e.g. a flip-flop), primary processor write-back delay circuit stage 2 126B (e.g. a flip-flop), and primary processor write-back delay circuit stage 3 126C (e.g. a flip-flop). The write-back comparison structures 125 further include secondary processor write-back delay circuit 128, which in this example system has a single stage. Primary processor write-back delay circuit 124 and secondary processor write-back delay circuit 128 are both operably connected to output to write-back comparator 130, which is configured to compare the respective signals of primary processor write-back delay circuit 124 (e.g. from primary processor write-back delay circuit stage 3 126C) and secondary processor write-back delay circuit 128. Write-back comparator 130 outputs write-back comparison results 132 indicating a match or no match.

In the exemplary system of DCLS 100, data comparison (e.g. by store data comparator 120 or write-back comparator 130) is performed on the data before either performing a store (for example in memory access/store stage 110A, 110B)) or a write-back operation (for example, in write-back operation 112, 112B). That is, the store operation is performed only if the store data comparator 120 determines that the compared data from primary processor 102 and from secondary processor 103 match-a match indicting no fault and a lack of a match indicating a fault. And, the write-back operation is performed only if the write-back comparator 130 determines that the compared data from primary processor 102 and from secondary processor 103 match-a match again indicting no fault and a lack of a match indicating a fault.

In some embodiments, a fault (especially a second fault) may cause invocation of exception handler 113. Exceptions are discussed further below in reference to operations 416, 420, 422, and 422 of FIG. 4B. Exception handler 113 is operably coupled to higher level program 190 for making higher level decisions when an exception results in system 100 being inoperable (See operation 424 of FIG. 4).

In exemplary DCLS system 100, the primary processor 102 and the secondary processor 103 operate two clock cycles apart. Because of this, before the data comparisons by store data comparator 120 and write-back comparator 130, the data from primary processor 102 and secondary processor 103 are compared after being synchronized by delay circuits. For example, the store data is synchronized by primary processor store data delay circuit 114 (and its three clock cycle delay by the three above stages) and secondary processor store data delay circuit 118 (and its single clock cycle delay). And continuing with this example, the write-back data is synchronized by primary processor write-back delay circuit 124 (and its three clock cycle delay by the three above stages) and secondary processor write-back delay circuit 128 (and its single clock cycle delay).

The performance of the comparisons by store data comparator 120 and write-back comparator 130 is an attempt to detect faults before store operations or write-back operations have occurred. Problems would arise if at the time of a fault detection, a store operation had already updated memory or a write-back operation had already updated a register file. In some instances, these incorrect memory and register file updates could be recovered if in response to the detected fault, the system returned to a last-known clean point and starts again. But in other instances, restarting from a last-known clean fails to correct the above incorrect memory and register file updates. This can lead to a program malfunction or other bad result. In general a single fault is treated as a transient fault whereas a second fault (after restarting from the last known clean point) is treated as a permanent fault.

The last-known clean point can be set up by program or periodic hardware interrupt such as timer setting. This process of periodically setting a last-known clean point is computationally expensive. And returning to a last-known clean point is also computationally expensive-more so than a context switch for a process switch. Thus, it is advantageous to develop systems that avoid returning to a last known clean point, at least for a transient fault.

Figure 2:
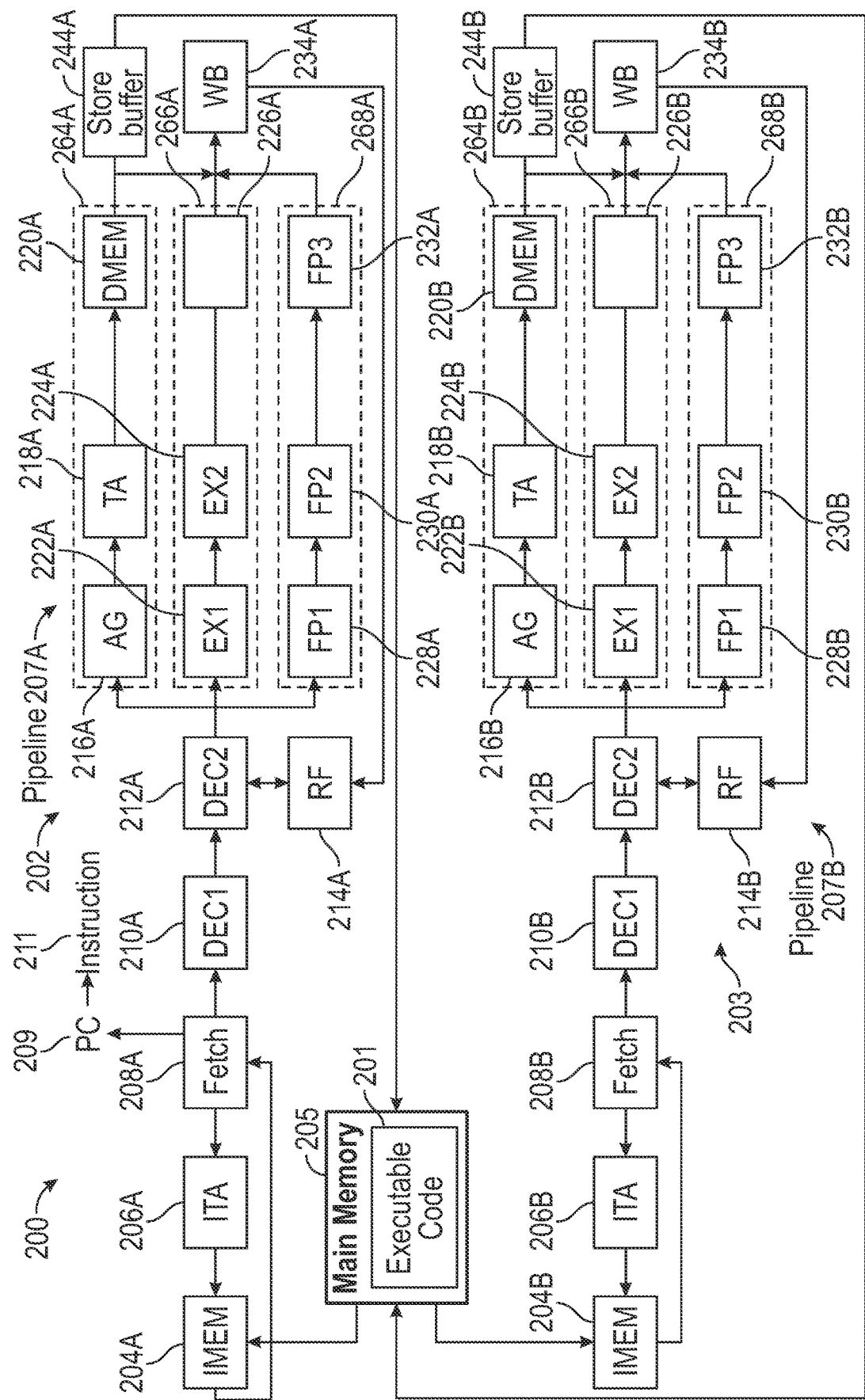
FIG. 2 is a simplified block diagram of another exemplary system that is capable of operating in DCLS mode and non-DCLS DCLS mode, showing a primary processor and a secondary processor, consistent with some embodiments.

Referencing FIG. 2, a dual-processor system 200 is an environment in which some embodiments may be practiced. System 200 includes primary processor 202 and secondary processor 203. System 200 is capable of operating in a DCLS mode (e.g. reliability mode) and in a non-DCLS mode. In non-DCLS mode, primary processor 202 does not act as a primary processor and secondary processor 203 does not function as a secondary processor. Instead, primary processor 202 and secondary processor 203 function as two independent processors. FIG. 2 shows two CPU pipelines for non-DLCS mode. FIG. 3, discussed below, shows a portion of primary processor 202 in DCLS mode.

Primary processor 202 and secondary processor 203 are both in-order-issue, in-order-completion, microprocessors based on RISCV architecture. The instruction pipelines for primary processor 202 and secondary processor 203 include fetch stages 208A, 208B, virtual instruction address conversion (VIA) 206A, 206B, and instruction memories (IMEM) 204A, 204B. In some implementations, fetch stages 208A, 208B provide virtual instruction addresses of instructions-to-be-fetched to VIA's 206A, 206B to convert virtual instruction addresses to a physical instruction addresses.

Fetch stages 208A, 208B may have obtained the virtual instruction address from a program counter 209 which indicates an instruction 211 via a virtual address. That is, the program counter 209 utilized by fetch stages 208, 208B points to a virtual address. In virtual address conversion (VIA's) 206A, 206B, the program counter 209 and its associated virtual address is converted and the program counter as converted points to a physical address which is the converted virtual address. Thus, the program counter utilized in fetch stages 208A, 208B and in VIA's 206A, 206B are different.

Virtual instruction address conversion (VIA's) 206A, 206B provide physical instruction addresses to the IMEM's 204A, 204B, which in some implementations are instruction caches or static random access memories (SRAM's). IMEM's 204A, 204B uses the physical instruction addresses to obtain the next instructions and provides the next instructions to fetch stages 208A, 208B. In one implementation, each of primary processor 202 and secondary processor 203 fetches multiple 32-bit/16-bit instructions every clock cycle from IMEM's 204A, 204B if they are available and then stores these fetched instructions are in instruction buffer associated with fetch stage 208A, 208B. In some embodiments, IMEM's 204A, 204B are caches operably coupled to Main Memory 205 for fetching executable code 201.

Each of primary processor 202 and secondary processor 203 also includes first decode stages 210A, 210B (DEC1) and second decode stages 210A, 210B (DEC2). In one implementation, the first decode stages 210A, 210B make alignment and decode instructions from mixed instructions (e.g. 16-bit and 32-bit) received from fetch stages 208A, 208B and then decide which execution sub-pipeline is to be used. The second decode stages 212A, 212B determine if the necessary operands and execution units are available. If a pipeline resource is not available or if an operand is not available from the register file or forwarding logic in pipeline, then an instruction stalls until the resource (pipeline) or operand condition can be fulfilled. Because microprocessor 200 is an in-order issue machine, the following instructions are also stalled. During or after second decode stages 212A, 212B, instructions are considered to be issued. Thus, in some embodiments, second decode stages 212A, 212B are also referred to as issuance stages.

After the second decode stages 212A, 212B, control moves to one of the sub-pipelines (ALU, load/store, or floating point). The load/store sub-pipelines 264A, 264B each have three stages. These are address generation stages 216A, 216B, (AG), address translation/memory access stages 218A, 218B (TA), and data memory 220A, 220B (DMEM). The address generation stages 216A, 216B generate virtual addresses. The address translation/memory access stages 218A, 218B translate the virtual addresses into actual physical memory addresses and this function may be performed by a memory management unit (MMU). These physical addresses can target a data cache, non-cacheable memory, or other memory. In parallel, the processors can be accessing a cache based on previously translated addresses and can be reading multiple cache lines. On the following clock cycle, the processors select one cache line data from the read multiple cache line data. The processors act on the selected cache line data.

If the operation is a data load operation (i.e. a read operation from memory), the selected cache line data passes through DMEM and then is saved to a register file (e.g. register files 214A, 214B) in a write back stage (e.g. write back stages 234A, 234B).

If the operation is a store operation, then in the next clock cycle, DMEM (data memory) is accessed, permissions are checked, and the converted physical address and the store data (e.g. data to be stored) are transmitted to a store buffer (see, e.g. store buffers 244A, 244B). From store buffer, the store is performed with the converted physical address and the store data. The store buffer is spilt into cache or memory when load operation is not active.

Turning to the ALU sub-pipelines 266A, 266B, they have first execution stages (EX1) 222A, 222B and second execution stages (EX2) 224A, 224B. These perform arithmetic operations such as multiplication, addition, subtraction, and some logical and shift operations. All operations are performed in a pipeline manner. Additionally, there are dummy pipeline stages 226A, 226B, for synchronization with the other sub-pipelines.

Turning to the floating point sub-pipelines 268A, 268B, these include three floating point stages. These include first floating point stages (FP1) 228A, 228B, second floating point stages (FP2) 230A, 230B, and third floating point stages (FP3) 232A, 232B. These perform floating point arithmetic. Due to complexity, floating point operations take three clock cycles.

Figure 3A:
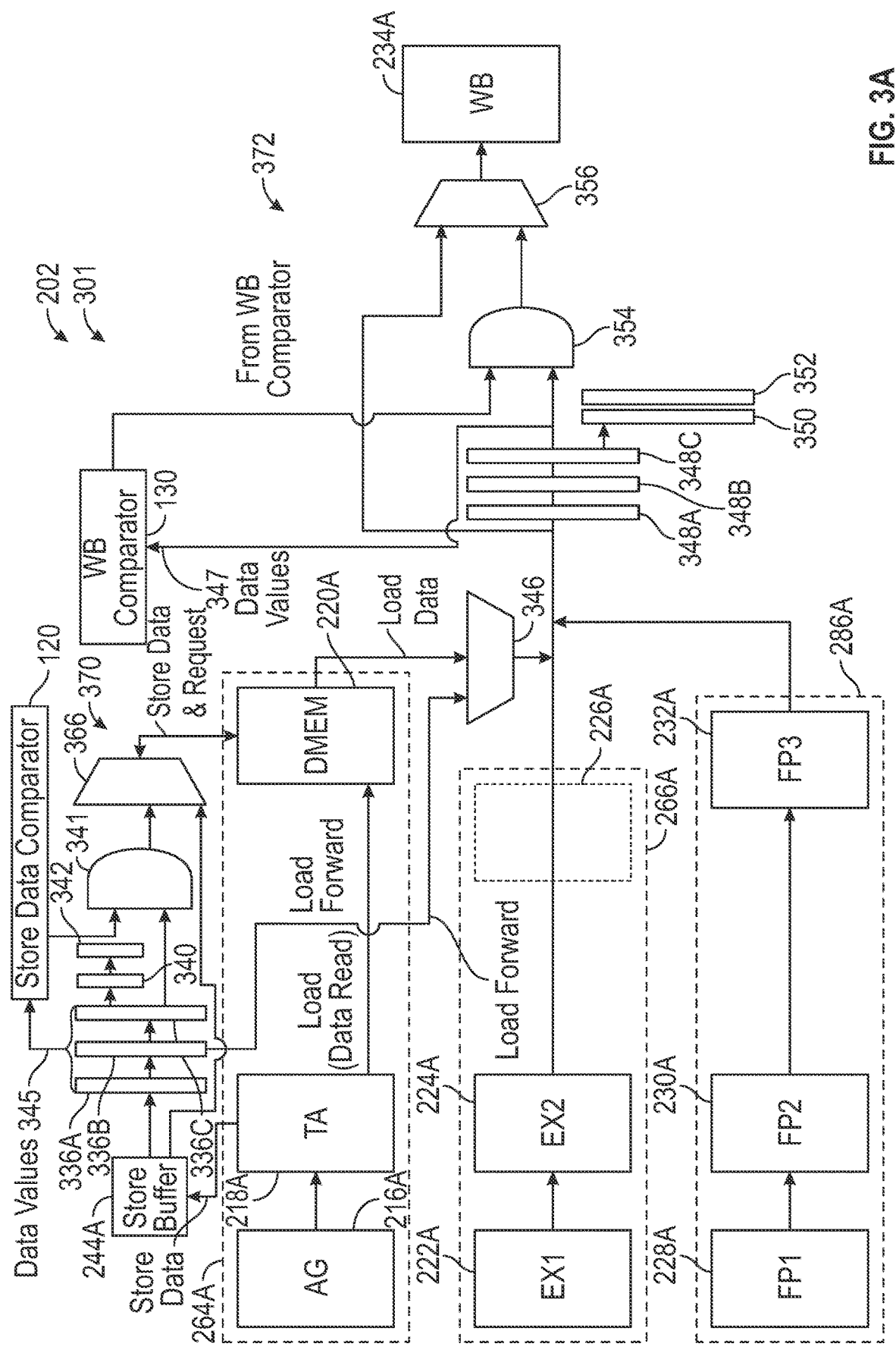
FIGS. 3A and 3B are more detailed block diagrams of the primary processor of FIG. 2, showing circuitry for operating in DCLS mode, consistent with some embodiments.

Referencing FIG. 3A, a portion 301 of the primary processor 202 is shown. This portion 301 includes primary processor store data comparison structures 370 that are disposed in the load/store sub-pipeline 264A of primary processor 202 after data memory 220A (DMEM). The store data comparison structures include primary processor store data delay circuit stage 1 336A, primary processor store data delay circuit stage 2 336B, and primary processor store data delay circuit stage 3 336C, a primary processor first store data historical storage buffer 340, a primary processor store data historical storage buffer stage 2 342, a store data comparator 120 (e.g. comparing data values 345 from primary processor store delay circuit stage 3 336C with data values 385 from secondary processor store data delay circuit 386 of FIG. 3B), primary processor store data control gate 341, and primary processor store data multiplexor 346.

This portion 301 further includes primary processor write-back comparison structures 372 that are disposed in the pipeline of primary processor 202 after data memory 220A (DMEM) but before data the write-back stage 220A. The write-back comparison structures include three primary processor write-back delay circuit stages 348A, 348B, 348C, a primary processor write-back historical storage buffer stage 1 350, a primary processor write-back data historical storage buffer stage 2 352, a write-back comparator 130 (e.g. comparing data values 347 from primary processor write-back delay circuit stage 3 348C with data values 387 from secondary processor write-back delay circuit 393 of FIG. 3B), a primary processor write-back control gate 354, and primary processor write-back multiplexor 356.

Turning to the primary processor store data comparison structures 370, if the operation is a read operation, the output of the address translation/memory access stage 218A is input to data memory 220A (DMEM). Then the read data is passed through to the write-back stage 234A, as discussed above relative to FIG. 2. If the operation is a store operation, then the translated physical address and store data are transmitted both to the store buffer 244A.

From the store buffer 244A, the translated physical address and the store data are passed from the store buffer 244A sequentially through three primary processor store data delay circuit stages 336A, 336B, 336C to synchronize with the secondary processor 203, which executes two clock cycles behind primary processor 202, but which only has one delay circuit stage 118.

From the three primary processor delay circuit stages 336A-336C, the translated physical address and store data is transmitted to both the store data comparator 120 (as discussed above relative to FIG. 1) and to a primary processor first store data historical storage buffer 340. The operation and function of this primary processor store data historical storage buffer stage 1 340 is discussed below. Primary processor 202 also includes a primary processor store data historical buffer stage 2 342, which is also discussed below.

The operation of store data comparator 120 is discussed above relative to FIG. 1. The output (e.g., match or no match) of the store data comparator 120 goes to store data control gate 341 (e.g. an AND gate) which also receives as input the output of primary processor store data delay circuit stage 3 336C (in other implementations this could be the input of any of primary processor store data delay circuit stages 336A-336C). If the input from store data comparator 120 is indicative of a match, then store data control gate 341 outputs the data values from primary processor store data delay circuit stage 3 336C to first store data multiplexor 366.

In addition to receiving the output of store data control gate 341, first store data multiplexer 366 receives the output of store buffer 244A. When processor 202 is operating in reliability mode (e.g. DCLS mode), then first store data multiplexor 366 selects the input of store data control gate 341. However, when processor 202 is operating in non-reliability mode (e.g. non-DCLS mode), then first store data multiplexor 366 selects input from the store buffer 244A, thereby by-passing the other primary processor store data comparison structures 370. First store data multiplexor 366 transmits the selected input to data memory DMEM 220A. The write operation is completed upon the transmission from first store data multiplexor 366 to data memory DMEM 220A.

Meanwhile, a second store data multiplexor 346 receives input from primary processor store data delay circuit stage 2 336B and from data memory DMEM 220A. Second store data multiplexor 346 selects data from DMEM 220A (for load operations) or primary processor store data delay circuit stage 2 336B (for delayed write operations).

When a load instruction arrives at DMEM 220A from TA 218A, the load instruction is checked by DMEM 220A by default. But there is still a chance that there was an earlier store instruction but data for the store instruction is still in the store buffer 244A or the delay circuit stages 336A-336C, and has not yet arrived at DMEM 220A. In this potential scenario, the store operation must be completed before the load operation can be performed. Thus, a check is performed to determine if the address associated with the store operation is still in the in the store buffer 244A or the delay circuit stages 336A-336C. If there is a match, then the completion of the store operation is performed by having the second store data multiplexor 346 select the input from the primary processor store data delay circuit stage 2 336B rather than from DMEM 220A.

Consider the following example situation:

1. Store Data in register R1 to Address A2 (when store operation is completed, data stored at Address A2 is updated).

2. Load Data from Address A2 to register R3 (Data is to be read from Address A2—but this must be prevented until the store operation is completed).

The load from Address A2 may be delayed until the store operation is completed by having second store data multiplexor 346 select the input from the primary processor store data delay circuit stage 2 336B rather than from DMEM 220A.

The output of store data multiplexor 346 is transmitted (as the output of the store/load sub-pipeline 264A) to primary processor write-back comparison structures 372, which is discussed below. The function of the arithmetic logic sub-pipeline 266A and of the floating point sub-pipeline 268A are also transmitted to the primary processor write-back comparison structures 372.

Turning to the primary processor write-back comparison structures 372, the output of the store data multiplexor 346 is input to, in sequence, write-back delay circuit stage 1 348A, write-back delay circuit stage 2 348B, and write-back delay circuit stage 3 348C. This synchronizes with secondary processor write-back delay circuit 128. The output of the write-back delay circuit stage 3 348C is output to write-back comparator 130.

The operation of write-back comparator 130 is discussed above relative to FIG. 1. The output of write-back comparator 130 (indicating either a match or no match) goes to write-back control gate 354 (e.g. an AND gate) which also receives as input the output of primary processor store data delay circuit state 3 348C (this is an implementation-specific detail). If the input from write-back comparator 130 is indicative of a match, then write-back control gate 354 outputs the data values from primary processor store data delay circuit state 3 348C to write-back multiplexor 356. When processor 202 is operating in reliability mode (e.g. DCLS mode), then write-back multiplexor 356 transmits the output of control gate 354 to the write-back stage 234A. However, when processor 202 is operating in non-reliability mode (e.g. non-DCLS mode), then multiplexor selects input from other output (e.g. DMEM 220A, dummy pipeline stage 226A, or third floating point stage FP3 232A). Write-back stage 234A updates register file 214A as shown in FIG. 2.

In addition, the output of the three primary processor write-back delay circuit stages 348A, 348B, 348C is transmitted to write-back multiplexor 354. The output of store data multiplexor 346 is transmitted (as the output of the store/load sub-pipeline 264A) to primary processor write-back comparison structures 372, which is discussed below. The function of the arithmetic logic sub-pipeline 266A and of the floating point sub-pipeline 268A are also transmitted to the write-back comparison structures.

Figure 3B:
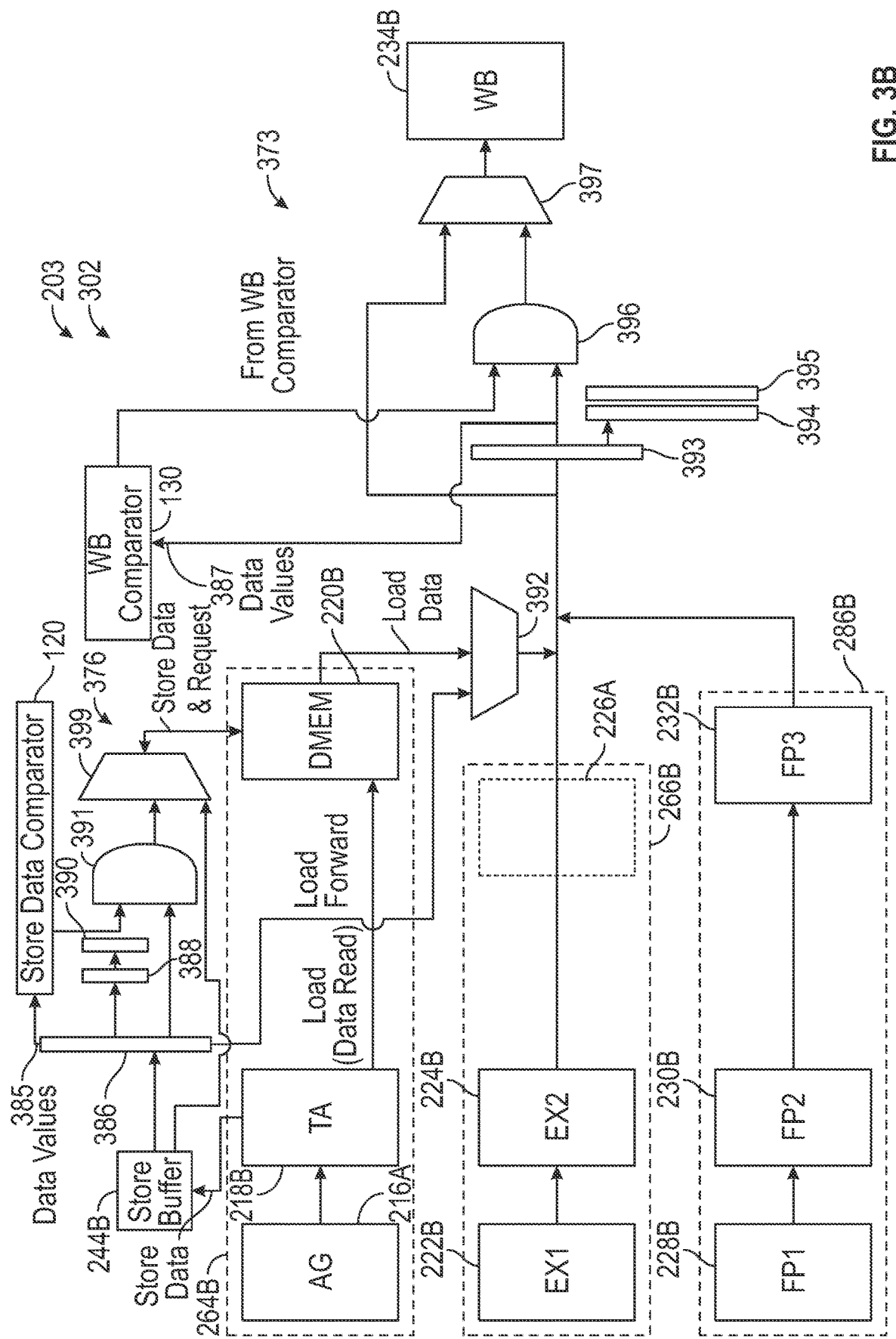

Referencing FIG. 3B, a portion 302 of the secondary processor 203 is shown. This portion 302 includes secondary processor store data comparison structures 376 that are disposed in the load/store sub-pipeline 264B of secondary processor 203 after store buffer 244B. The secondary processor store data comparison structures 376 include secondary processor store data delay circuit 386, a secondary processor store data historical storage buffer stage 1 390 388, a secondary processor store data historical storage buffer stage 2 390, a store data comparator 120, secondary processor store data control gate 391, a first secondary processor store data multiplexor 399 and a second secondary processor store data multiplexor 392.

This portion 302 further includes secondary processor write-back comparison structures 373 that are disposed in the pipeline of secondary processor 203 after second secondary processor store data multiplexor 392 but before the secondary processor write-back stage 234B. The secondary processor write-back comparison structures 373 include secondary processor write-back delay circuit 393, a secondary processor first write-back historical storage buffer 394, a secondary processor write-back data historical storage buffer 395, a write-back comparator 130, a secondary processor write-back control gate 396, and secondary processor write-back multiplexor 397.

The functions of secondary processor store data comparison structures 376 and secondary processor write-back comparison structures 373 are as discussed above regarding primary processor store data comparison structures 370 and primary processor write-back comparison structures 372, except that in the implementations shown the secondary processor store data comparison structures 376 and secondary processor write-back comparison structures 373 each have only a single delay circuit.

As discussed above, three primary processor store data delay circuit stages (336A, 336B, 336C) are operational in primary processor 202 for use when primary processor 202 is executing in reliability mode (e.g. in a mode utilizing DCLS). And these three store data delay circuit stages (336A, 336B, 336C) are bypassed during regular operation, which is non-DCLS mode. These extra three store data delay circuit stages (336A, 336B, 336C) delay the data update until the store data comparator 120 provides confirmation of a match between the state of the primary processor 202 and the secondary processor 203. Once the comparator provides the confirmation of a match, then an update is executed.

A store data comparison will be made between the third store data layer (e.g. primary processor store data delay circuit stage 3 116C) of the primary processor (e.g. 102, 202) and the secondary processor store data delay circuit 118) of the secondary processor.

A write-back comparison may be made between the third write-back layer (e.g. primary processor write-back delay circuit stage 3 126C) of the primary processor (e.g. 102, 202) and the secondary processor store write-back delay circuit 128 of the secondary processor.

During reliability mode, (e.g. DCLS mode) the 3 extra delay stages in the primary processor can introduce performance hits due to slowed register file (ARF) updates. To compensate for a stall condition from slowed ARF updates, additional data forwarding is required from store path and write back path. In some embodiments, this additional data forwarding includes sending a result (e.g. a result which is not in the register file) to first execution stage EX1 220A such that pipeline can keep moving. Typically, when data is moving through pipeline, the destination target (e.g., a destination register file ID) is moving together with the data. In these embodiments, the pipeline checks to assure that the destination register ID in the pipeline matches to an operand register file ID in the second decode stage DEC2 212A. This additional data forwarding is turned off during non-DCLS mode.

If the above comparisons result in a fault being detected, then the instructions in the processor pipelines are invalidated by flushing instructions in decode stages and execution stages. For example, in a system similar to 100, instructions in the decode stages 106A, 106B and EX/MA stages 108A, 108B are flushed. In a system similar to 200, decode stages 210A, 210B, 212A, 212B and instructions in sub-pipelines 264A, 264B, 266A, 266B, 268A, and 268B are flushed. Instructions in the fetch stages may also be flushed.

In addition to flushing instructions, some data is saved for diagnostic and recovery purposes. For example, referencing FIG. 3, in primary processor 202, one of two copy operations are performed. Data values in store data delay circuit stage 3 336C are copied to primary processor store data historical storage buffer stage 1 340. And alternatively, data values in write-back delay circuit stage 3 348C are copied to primary processor write-back historical storage buffer stage 1 350. Similar copy operations are performed in the secondary processor 203. In particular, data values in secondary processor store data delay circuit 386 are copied into secondary processor store data historical buffer stage 1 388 and data values in secondary processor write-back delay circuit 393 are copied into secondary processor write-back historical storage buffer stage 1.

After the copying of the above data values, execution begins again in the primary processor with the instruction pointed to by the program counter associated with either the primary processor store data delay circuit stage 1 336A or the primary processor write-back delay circuit state 1. A corresponding instruction pointed to by a program counter in the secondary processor is selected for execution. This reduces overhead as compared to starting again from a known clean point.

Once re-execution reaches the stage where the fault occurred, the data comparison is performed again. At this point, data values in either primary processor store data delay circuit stage 3 336C or primary processor write-back delay circuit stage 3 348C are compared with, as appropriate, secondary processor store data delay circuit 386 or secondary processor write-back delay circuit 393. The above comparison determines if there is another fault. If there is a match, execution continues with each processor updating either the ARF or memory.

If there is a second fault, data is first copied from the appropriate stage 1 historical storage buffers to the stage 2 historical storage buffers. For example, in the primary processor, if the first fault was detected by the write-back comparator 130, then data values from the primary processor write-back historical storage buffer stage 1 350 are copied to the primary processor write-back historical storage buffer stage 2 352. The copying of the data values from the appropriate stage 1 historical storage buffers to the stage 2 historical storage buffers frees the appropriate stage 1 historical storage buffers for use in the next operation. In the next operation, depending on where the second fault occurred (in the store data stages or in the write-back stages), data values in the primary processor are copied either from primary processor store data delay circuit stage 3 to primary processor first store data historical storage buffer 340 or from primary processor write-back delay circuit stage 3 348C to primary processor write-back historical storage buffer stage 1 350.

After the above is performed an exception is triggered and an exception handler 113 is called. The exception handler may perform one or more of the following:
 1. Begin execution again from the known clean point to confirm if there is a permanent fault; or
 2. Reporting a permanent fault to either a higher level program (e.g. recovery circuit 190) or to a human administrator.

Figure 4A:
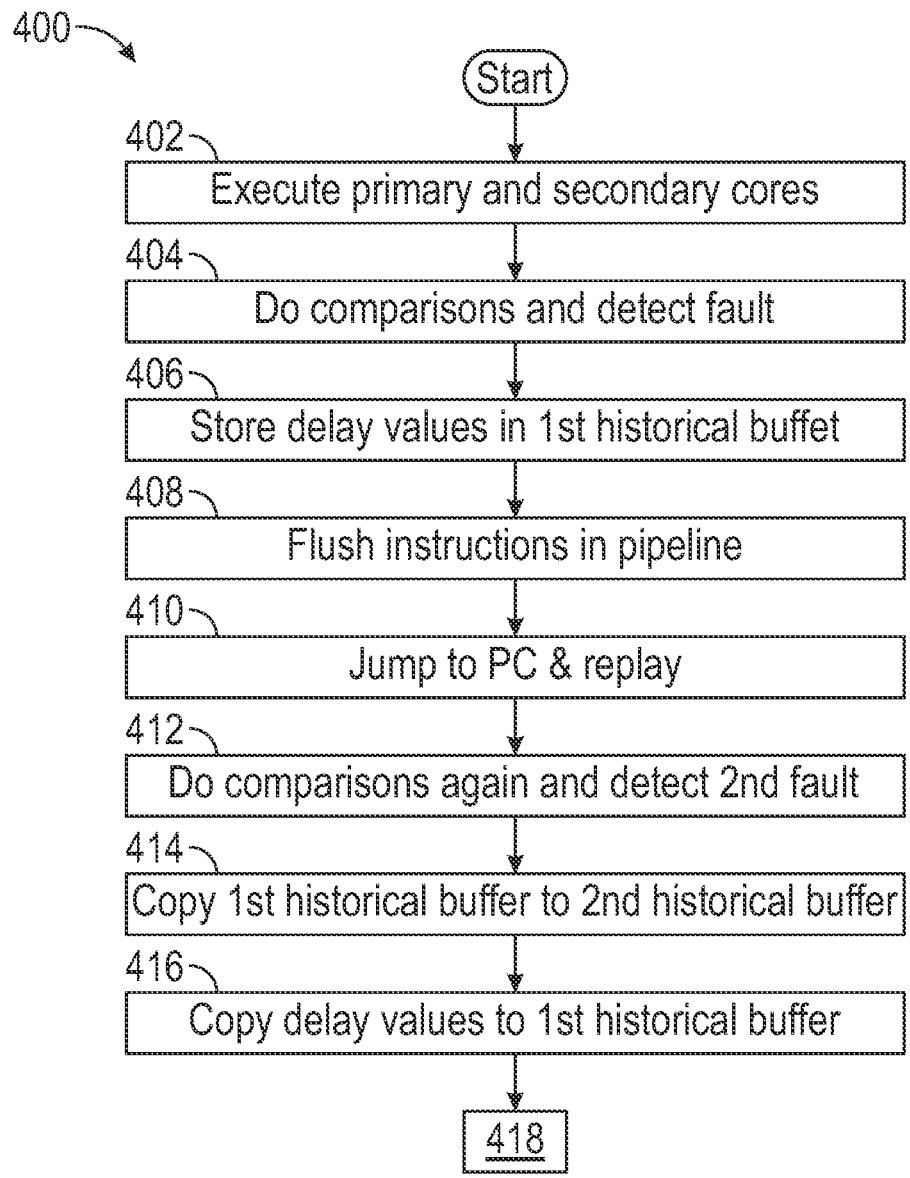
FIGS. 4A and 4B are method flow charts which collectively illustrate an exemplary method, consistent with some embodiments.
Figure 4B:
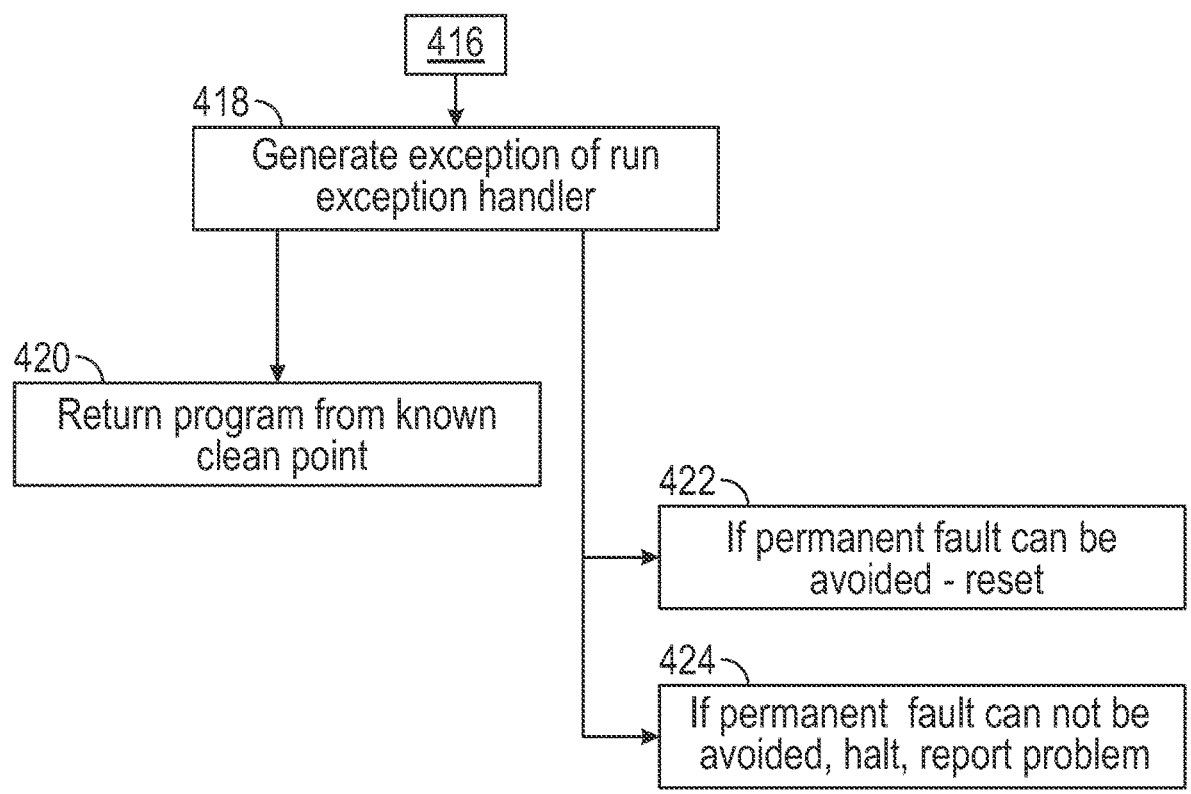

Referencing FIG. 4, a method 400 of detecting and responding to faults is disclosed. After a start operation, at process block 402 a primary processor (e.g. 202) and a secondary processor (e.g. 203) both execute an identical program (e.g. executable code), but with the secondary processor delayed (e.g. delayed 2-3 clock cycles) relative to the primary processor.

At process block 404, a comparator circuit (e.g. store data comparator 120 or write-back comparator 130) performs a comparison of corresponding data values that in the absence of a fault should be identical. In some embodiments, data values for this comparison are synchronized by two or more delay circuits in the primary processor and a single delay circuit in the secondary processor. The number of delay circuits in the primary processor is based at least partly on the number of clock cycles by which the primary processor and the secondary processor are executing apart. For example, if the secondary processor is delayed by two clock cycles relative to the primary processor, then the secondary processor may have one store data delay circuit and one write-back delay circuit and the primary processor may be three store data delay circuits and three write-back delay circuits. IF the comparator circuit finds a match, then execution continues (e.g. with a ARF update or a memory update). If the comparator circuit finds a mismatch, then a fault is detected. Since this is a first fault, it is treated as a transient fault.

At process block 406, responsive to detection of a fault, one or more delay values are stored in a first historical buffer. For example, if the fault was detected by the store data comparator 120, then data values from primary processor store data delay circuit stage 3 336C are copied to primary processor store data historical storage buffer stage 1 340 and data values from secondary processor store data delay circuit 386 are copied to secondary processor store data historical storage buffer stage 1 390 388. Alternatively, if the fault was detected by the write-back comparator 130, then data values from primary processor write-back delay circuit stage 3 348C are copied to primary processor write-back historical storage buffer stage 1 350 and data values from secondary processor store data delay circuit 386 are copied to secondary processor store data historical storage buffer stage 1 390 388.

At process block 408, still responsive to the detection of the fault, instructions are flushed from the primary processor pipeline and from the secondary processor pipeline. In some embodiments, instructions are only flushed from decode stages and from execution stages. In some embodiments, instructions are further flushed from fetch stages.

At process block 410, the program (e.g. executable code) is partially re-executed. In some embodiments, the partial re-execution starts with an instruction pointed to by a program counters associated with data values that failed to match and are associated with the fault.

For example, if a fault is detected by the store-data comparator 120, the primary processor may re-execute the program beginning at an instruction pointed to by a program counter associated with (e.g. leading to) data values in the primary processor store data circuit stage 3 336C at the time of the fault. In that example, the secondary processor may re-execute the program beginning with an instruction pointed to by a program counter associated with (e.g. leading to) data values in the secondary processor store data delay circuit 386 at the time of the fault.

In contrast, if a fault is detected by the write-back comparator 130, the primary processor may re-execute the program beginning at an instruction pointed to by a program counter associated with (e.g. leading to) data values in the primary processor write-back circuit stage 3 348C at the time of the fault. In that example, the secondary processor may re-execute the program beginning with an instruction pointed to by a program counter associated with (e.g. leading to) data values in the secondary processor write-back delay circuit 393 at the time of the fault.

However, the above is merely a design choice. In alternative embodiments, the re-execution is performed similar to a jump instruction. That is, a program counter associated with a fetch stage is replaced with another desired program counter immediately after the flushing of the pipeline. For example, in some embodiments, a mismatch signal from a comparator indicates a fault. A PC value associated with the instruction that caused the fault is substituted for the PC value associated with the current Fetch stage.

At process block 412, when the re-execution of the program reaches the location of the previous fault (e.g. the same point in the executable code 201 reaches store data comparator 120 or write-back comparator 130), the comparator circuit (e.g. store data comparator 120 or write-back comparator 130) performs another comparison of corresponding data values in the primary and the secondary processors that in the absence of a fault should be identical. In some embodiments, the location of the previous fault is defined as when the valid first comparison point becomes the previous comparison point. In these embodiments, re-execution restarts from the previous fault point.

For example, in some embodiments, if an instruction at memory/cache address N was associated with a first fault, this indicates that all the instructions earlier than address N executed properly and did not cause the first fault. In addition, younger instructions (for example, instructions in the pipeline after address N) had yet reached the comparator and therefore were also not a cause of the first fault. Thus, upon detection of the first fault, all the younger instructions are flushed. The processor then selects the instruction located at address N from the memory/cache because after the first fault, the instruction at address N is the first instruction in the pipeline. Thus, re-execution can begin with the instruction at address N and it is regarded as the location of the previous fault point. Then, if there is another fault, this may indicate a permanent fault.

In some embodiments, data values for this comparison are again synchronized by two or more delay circuits in the primary processor and a single delay circuit in the secondary processor. If the comparator circuit finds a match, then execution continues (e.g. with a ARF update or a memory update). If the comparator circuit finds a mismatch, then a second fault is detected, but this second fault may, depending on a particular implementation, be regarded as a permanent fault.

At process block 414, responsive to detection of a second fault, one or more delay values are copied from one or more first stage historical buffers to one or more second historical stage buffers. For example, if the fault was detected by the store data comparator 120, then in the primary processor data values stored in the primary processor store data historical storage buffer stage 1 340 are copied to the primary processor store data historical storage buffer stage 2 342. And in the secondary processor, data values stored in the secondary processor store data historical storage buffer stage 1 388 are copied to a secondary processor store data historical storage buffer stage 2 390. Thus, data values related to the first fault are stored in the one or more second stage historical storage buffers.

At process block 416, once again, one or more delay values are copied from a delay circuit to the first historical buffer. For example, if the second fault was detected by the store data comparator 120, then data values from primary processor store data delay circuit stage 3 336C are copied to primary processor store data historical storage buffer stage 1 340. And in the second processor, data values from secondary processor store data delay circuit 386 are copied to secondary processor store data historical storage buffer stage 1 390 388. Thus, data values related to the second fault are stored in the one or more first historical buffers.

At process block 418, responsive to the second fault, an exception is generated and an exception handler (e.g. 113) executes.

At process block 420, in one possible operation, the exception handler 113 re-runs the program from a known clean point to verify whether a permanent fault has indeed occurred.

At process block 422, in another possible operation, if the exception handler 113 determines that a permanent fault can be avoided by not using one or more defective parts, then the primary and secondary processors are reset and execution begins again, but without using the one or more defective parts.

At process block 424, in another possible operation, if the exception handler 113 determines that the use of one or more defective parts cannot be avoided, then the primary processor and the secondary processor are halted and a report of a permanent fault is made to a higher level program or to a human.

Some embodiments are now discussed.

Embodiment 1. In some embodiments a computational system comprises:
(a) a primary processor (e.g. 202) configured to execute executable code (e.g. executable code 201 in main memory 205), including at least at least updating at least one of a first register file (first ARF) (e.g. RF 214A) or a memory (e.g. main memory 205), the primary processor including at least:
  (i) two or more primary processor delay buffers (e.g. 336A-336C or 344A-344C), including at least one final primary processor delay buffer (e.g. 336C or 348C) that is last in a sequence (e.g. sequence of 336A-336C or 344A-344C) of at least some of the two or more primary processor delay stages; and
  (ii) one or more primary processor historical storage buffers (e.g. 340, 342 or 350, 352) communicatively coupled with the at least one final primary processor delay buffer (e.g. 336C or 348C);
(b) a secondary processor (e.g. 203) configured to execute the executable code (e.g. executable code 201 in main memory 205) one or more clock cycles behind the primary processor (see, e.g. FIGS. 12A and 12B showing CPU-1 executing 2 clock cycles behind CPU-0), including at least updating at least one of a second register file (second ARF) (e.g. RF 214B) or the memory (e.g. 205), the secondary processor including at least:
  (i) one or more secondary processor delay buffers (e.g. 386 or 393); and
  (ii) one or more secondary processor historical storage buffers communicatively coupled with the one or more secondary processor delay buffers (e.g. 388, 390 or 394, 395; and
(c) comparator circuitry (e.g. 120 or 130) configured for determining if there is a match between one or more first data values (e.g. 345 or 347) from the at least one final primary processor delay buffer and one or more second data values (e.g. 385 or 387) from the one or more secondary processor delay buffers, the lack of a match being indicative of a fault; and
(d) wherein, responsive to a fault, the primary processor is configured to store the one or more first data values (345 or 347) in the at least one primary processor historical storage buffer (e.g. 340 or 350 for first stage historical storage buffer) and the secondary processor is configured to store the one or more second data values in the at least one secondary processor historical storage buffer (e.g. 388 or 394 for first stage historical storage buffer).

Embodiment 2. The computational system of embodiment 1, wherein the primary processor and the secondary processor are architecturally identical (See, e.g. 202, 203).

Embodiment 3. The computational system of any of embodiments 1 or 2, wherein the executable code is at least a portion of a computer program.

Embodiment 4. The computational system of any of embodiments 1-3, wherein:
the two or more primary processor delay buffers (e.g. 336A-336C or 348A-348C) include at least two or more primary processor store data delay buffers (e.g. 336A-336C) positioned in a pipeline (e.g. 207A) of the primary processor before a store-to-memory operation (e.g. MEM 110A of FIG. 1, before store-to-memory with store buffer 244A of FIG. 2) and at least two or more primary processor write-back delay buffers (e.g. 348A-348C) positioned in the pipeline before a write-back (e.g. WB 234A) to the first ARF (e.g. RF 214A), the two or more primary processor store data delay buffers including at least a primary processor store data final delay buffer (e.g. 336C) and the two or more primary processor write-back delay buffers including at least a primary processor write-back final delay buffer (e.g. 348C); and
the one or more primary processor historical storage buffers (e.g. 340, 342, or 350, 352) include at least (1) a primary processor store data historical storage buffer (e.g. 340, 342) communicatively coupled with store data final primary processor delay buffer (e.g. 336C) and (2) at least a primary processor write-back historical storage buffer (e.g. 350, 352) communicatively coupled with the write-back final primary processor delay buffer.

Embodiment 5. The computational system of embodiment 4, wherein:
the one or more secondary processor delay buffers (e.g. 386 or 393) include at least a secondary processor store data delay buffer (e.g. 386) positioned in a pipeline (207B) of the secondary processor (e.g. 103, 203) before a store-to-memory operation (e.g. MEM 110A of FIG. 1, before store-to-memory with store buffer 244B of FIG. 2) and at least a secondary processor write-back delay buffer (e.g. 393) positioned in the pipeline before a write-back (e.g. WB 234B) to second ARF (e.g. RF 214B); and
the one or more secondary processor historical storage buffers (e.g. 388, 390 or 394, 395) include at least a secondary processor store data historical storage buffer (e.g. 388) communicatively coupled with secondary processor store data delay buffer (e.g. 386) and at least a secondary processor write-back historical storage buffer (e.g. 394) communicatively coupled with the secondary processor write-back delay buffer (e.g. 393).

Embodiment 6. The computational system of embodiment 5, wherein the at least one comparator circuit (e.g. 120 or 130) includes at least:
a store data comparator circuit (e.g. 120) is configured to determine a match between one or more first store-data data values associated with the store data final primary processor delay buffer and one or more second store-data data values associated with the secondary processor store data delay buffer; and
a write-back comparator circuit (e.g. 130) is configured to determine a match between one or more first write-back data values associated with the write-back final primary processor delay buffer and one or more second write-back data values associated with the secondary processor write-back delay buffer.

Embodiment 7. The computational system of embodiment 6, wherein:
responsive to a detection of a fault by the store data comparator circuit (e.g. 120), the primary processor is configured to store the one or more first store-data data values in the primary processor store data historical storage buffer (e.g. 340) and the secondary processor is configured to store the one or more second store-data data values in the secondary processor store data historical storage buffer (e.g. 388); and responsive to a detection of a fault by the write-back comparator circuit (e.g. 130), the primary processor is configured to store the one or more first write-back data values in the primary processor write-back historical storage buffer (e.g. 350) and secondary processor is configured to store the one or more second write-back data values in the secondary processor write-back historical storage buffer (e.g. 394).

Embodiment 8. The computational system of embodiment 7, wherein, responsive to a fault, the primary processor and the secondary processor are configured to re-execute at least a portion of the executable code (e.g. 201), the re-execution beginning with the fetching of an instruction (e.g. 211) pointed to by a program counter (e.g. 209) associated with the fault.

Embodiment 9. The computational system of any of embodiments 1-9, wherein the at least one comparator circuit is configured to determine if there is a match between the first data values and the second data values before the primary processor updates at least one of the memory or the first ARF and before the secondary processor updates at least one of the memory or the second ARF; and wherein, responsive to the comparator circuit not finding a match between the first data values and the second data values, the primary processor is configured to prevent at least one of the memory update or the first ARF update and the secondary processor is configured to prevent at least one of the memory update or the second ARF update.

Embodiment 10. The computational system of embodiment 9, wherein the at least one comparator circuit is configured to determine if there is a match between he first data values with the second data values before a memory update by the primary processor and before a memory update by the secondary processor.

Embodiment 11. The computational system of embodiment 9 or 10, wherein the at least one comparator circuit is configured to determine if there is a match between he first data values with the second data values before a write-back to first ARF by the primary processor and before a write-back to the second ARF by the secondary processor.

Embodiment 12. The computational system of any of embodiments 9-11, wherein, responsive to the comparator circuit finding a match between the first data values and the second data values, the primary processor is configured to perform at least one of the memory update or the first ARF update and the secondary processor is configured to perform at least one of the memory update or the second ARF update.

Embodiment 13. The computational system of any of embodiments 1-12, wherein, the primary processor, further responsive to the fault, is configured to flush one or more pipeline instructions and to re-execute at least a portion of the executable code, the re-execution beginning with the fetching of an instruction pointed to by a program counter associated with the fault; and wherein the secondary processor, further responsive to the fault, is configured to flush one or more pipeline instructions and to re-execute at least the portion of the executable code beginning with the fetching of the instruction pointed to by a program counter associated with the fault.

Embodiment 14. The computational system of embodiment 13, wherein the comparator circuit is further configured, responsive to the re-execution reaching a part of the re-execution associated with the fault, to perform a second determination of a match between one or more third data values from the at least one final primary processor delay buffer and one or more fourth data values from the one or more secondary processor delay buffers.

Embodiment 15. The computational system of any of embodiments 13-15, wherein the wherein the primary processor is configured, responsive to a second fault, to copy the one or more first data values from the at least one primary processor historical storage buffer to at least one primary processor second stage historical storage buffer (e.g. from 342 to 344 or from 350 to 352)) and wherein the secondary processor is configured, responsive to a second fault, to copy the one or more second data values from the at least one secondary processor historical storage buffer to at least one secondary processor second stage historical storage buffer (e.g. from 388 to 390 or from 394 to 395).

Embodiment 16. The computational system of any of embodiments 13-15, wherein the primary processor is further configured, responsive to a second fault, to store the one or more third data values into the at least one primary processor historical storage buffer (e.g. in 340 or 350) and wherein the secondary processor is further configured, responsive to a second fault, to store the one or more fourth data values into the at least one secondary processor historical storage buffer (e.g. in 388 or 394).

Embodiment 17. The computational system of any of embodiments 13-16, wherein at least one of the primary processor or the secondary processor is configured, responsive to the second fault, to invoke an exception handler (e.g. 113) to respond to a permanent fault, the exception handler configured to report the permanent fault to at least one of human or a higher process (e.g. by higher level program 190) and to provide the at least one of the human or the higher process with at least one of the first data values, the second data values, the third data values, or the fourth data values.

Embodiment 18. The computational system of embodiments 13 or 14, wherein the primary processor is configured responsive to the second determination resulting in a match to continue re-execution of the portion of the executable code and wherein the secondary processor is configured responsive to the second determination resulting in a match to continue re-execution of the portion of the executable code.

Embodiment 19: In some embodiments a computational method comprises:

(a) with a primary processor, executing executable code, including at least at least updating at least one of a first register file or a memory;

(b) with a secondary processor, executing the executable code one or more clock cycles behind the primary processor, including at least updating at least one of a second register file or the memory;

(c) determining if there is a match between one or more first data values from the at least one final primary processor delay buffer of a plurality of sequential primary processor delay buffers and one or more second data values from one or more secondary processor delay buffers, the lack of a match being indicative of a fault; and (e) storing, responsive to a fault, the one or more first data values in at least one primary processor historical storage buffer and the one or more second data values in the at least one secondary processor historical storage buffer.

Embodiment 20: In some embodiments a computational system comprises:
- (a) a primary processor configured to execute executable code, including at least at least updating at least one of a first register file (first ARF) or a memory, the primary processor including at least:
  - (i) two or more primary processor delay buffers, including at least one final primary processor delay buffer that is last in a sequence of at least some of the two or more primary processor delay stages; and
  - (ii) one or more primary processor historical storage buffers communicatively coupled with the at least one final primary processor delay buffer;
- (b) a secondary processor configured to execute the executable code one or more clock cycles behind the primary processor, including at least updating at least one of a second register file (second ARF) or the memory, the secondary processor including at least:
  - (i) one or more secondary processor delay buffers; and
  - (ii) one or more secondary processor historical storage buffers communicatively coupled with the one or more secondary processor delay buffers; and
- (c) comparator circuitry configured for determining if there is a match between one or more first data values from the at least one final primary processor delay buffer and one or more second data values from the one or more secondary processor delay buffers, the lack of a match being indicative of a fault; and
- (d) wherein, responsive to a fault, the primary processor is configured to store the one or more first data values in the at least one primary processor historical storage buffer and the secondary processor is configured to store the one or more second data values in the at least one secondary processor historical storage buffer; and wherein the primary processor and the secondary processor are architecturally identical.

Part B

This above portions of this application disclose various embodiments related to fault detection and responding to detected faults. These embodiments are related to operation in a reliability mode using Dual Processor Lock Step (DCLS). This portion of the application discloses a quasi-DLCS in which two processors are synchronized. In some embodiments the two processors are a primary and a secondary processor that are capable of performing a reliability mode. However, the processors are executing in multi-threaded environments in which the processors may go out of synchronization. Thus, technologies are disclosed for determining whether the processors are synchronized and responding to a lack of synchronization. This synchronization technology may be used in addition to the reliability modes disclosed above. That is reliability mode and the below synchronization technology may be used together. However, the details of reliability modes will not be the focus of the following discussion. For details of reliability mode, the reader is referred to the previous discussion.

Dual Processor Lock Step (DCLS) is a technology for reliable, fault tolerant, processor applications for mission critical tasks. Often DCLS uses two identical processors to execute the same program with a fixed delay between the two processors and with comparisons of key outputs or signals around the processor. If a mismatch between the two processors is found, then this is identified as a fault. Responsive to the fault, the processors stop executing the program and make a report to a monitoring block to trigger the necessary action according to the pre-classified mismatch type.

There are several ways to recover and resume execution if the fault is identified as temporary fault. For example, upon detection of a fault, the processors may restart from a known clean point. Or the processors may issue a reset and restart. Or, the processors may request a replacement part.

The process of recovering from a fault may take a relatively lengthy time, although early detection and prevent processor errors. Because DCLS usually uses two identical processors, DCLS consumes more silicon area and power.

If DCLS can be performed with different processors with the same instruction set architecture (ISA), the following benefits are possible:
- a. Two processors of different power may be used for different tasks. For example a lower power processor may be used for a mission-critical task that does not require high performance, for a non-mission critical task, or for a task that does not require reliability.
- b. Two different multi-thread processors with a different mix of high power and low power cores may be deployed for simultaneous execution of reliability required tasks and non-reliability related tasks.
- c. In both of (a) and (b) above, both silicon area and operational power can be reduced significantly.

However, realizing the above advantages poses challenges. Many DCLS systems require identical processors, such as identical primary and secondary processors. Use of non-identical processors-even if they use the same instruction set architecture (ISA)—can cause synchronization issues between the two processors as they attempt to operate in reliability mode. This lack of synchronization may make it difficult or impossible to obtain the above benefits of using two different processors. Thus, there is a need for synchronization technologies that allow use of reliability modes with different types of processors that use the same ISA. Yet, there are challenges to keeping two non-identical processors synchronized.

A first such challenge is posed by systems utilizing multi-threaded processors. For example, in one exemplary computing environment, a fine grain, in-order issue, and in-order completion multi-thread processor is deployed. This multi-threaded processor includes a multi-stage pipeline: a fetch stage, decode and issue stages, execution stages, a memory access stage, and a write-back stage. This processor has an RISCV ISA and it can execute up to 4 programs in parallel. There is a thread map register (e.g. or other circuitry for allocating time slots among a plurality of threads) configured for allocating up to 16 time slots. Thus, processor can execute a single program with max performance, and up to 4 programs can be divided into 16 time slots such that each program can have various performance. When two identical programs are executed on each processor with reliability requirements, these two programs can be out of synchronization easily because each processor could run 3 more additional different programs independently. This loss of synchronization could result from a variety of factors in a multi-threaded environment, including for example, multi-cycle instructions, cache misses, bus contention, or interrupts. Thus, there is a need for synchronization technologies for reliability mode in multi-threaded environments.

A second such challenge is posed where a primary processor and a secondary processor use the same ISA but have a different number of pipeline stages. For example, in some embodiments a primary processor might have 7 pipeline stages and a secondary processor might have 5 pipeline stages. The above is just an example, but it illustrates the challenges of keeping the primary processor and the secondary processor synchronized for purposes of DCLS.

A third such challenge is the result of the first and the second challenges and that is that it becomes difficult to have the secondary processor executing an executable program a fixed number of clock cycles behind the primary processor. Thus, in some embodiments the secondary processor executes an executable program a variable number of clock cycles behind the primary processor.

In some disclosed embodiments, a primary processor and a secondary processor are capable of operating in or out of reliability mode in synchronization. The primary and the secondary processor may each be equipped with a circular buffer (or other FIFO buffer) that receives program counters (PC's) and other associated instruction data. The instruction data in the two circular buffers is compared with a comparator to determine if the two processors are synchronized. If the two processors are synchronized, execution proceeds. If the two processors are not synchronized, responsive action is taken. Using the above technology, together with features discussed below, some embodiments utilize: (1) multi-thread processors, (2) non-identical primary and secondary processors; and/or (3) a secondary processor that executes an executable program a variable number of clock cycles behind a primary processor.

Figure 5:
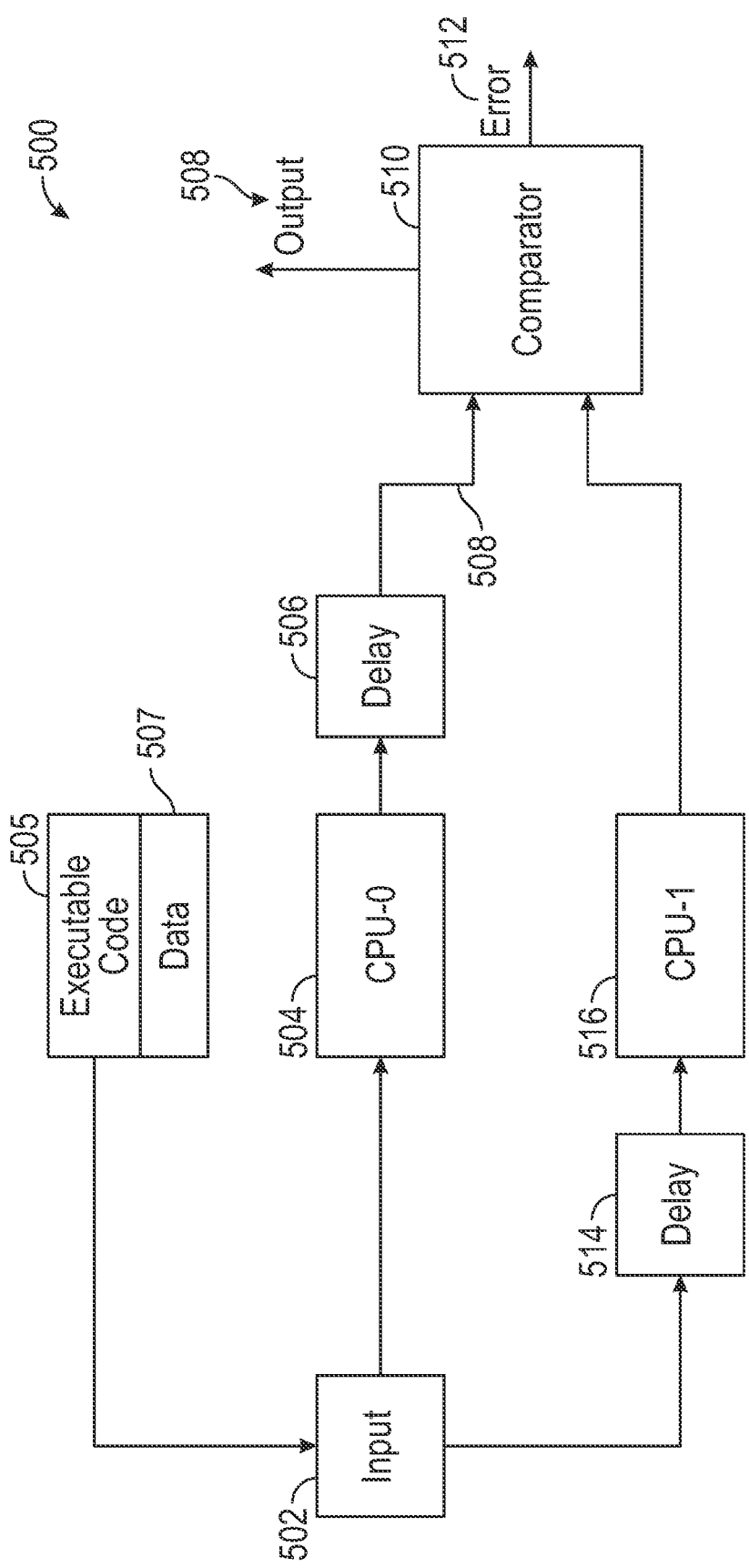
FIG. 5 is a simplified block diagram of an exemplary DCLS system, showing a primary processor (CPU-0) and a secondary processor (CPU-1).

Referencing FIG. 5, a typical DCLS system 500 is disclosed. System 500 includes a primary processor 504 (CPU-0) and a secondary processor 516 (CPU-1), each executing the same executable code 505 (with access to data 507), but with secondary processor 516 delayed relative to the primary processor 505. In this example, the primary processor 504 and the secondary processor 516 are identical.

In this system 500, primary processor 504 is operatively coupled directly to input 502 but secondary processor is operatively coupled to input 502 via delay 514 (e.g. one or more flip-flops). Delay 514 causes secondary processor to be delayed one or more clock cycles relative to primary processor 504. When it is desirable to compare the output of the primary processor 504 with the output of secondary processor 516, it is necessary to synchronize the two outputs. In system 500 this synchronization is performed by routing the output of the primary processor 504 through delay 506. This delay 506 synchronizes the output 508 of the primary processor 504 with the output of the secondary processor. Both of these synchronized outputs are then compared in comparator 510. If comparator 510 determines that the two outputs match, the output 508 of the primary processor 504 is allowed to proceed. If the comparator determines that there is a mismatch, then an error 512 is issued.

Figure 6:
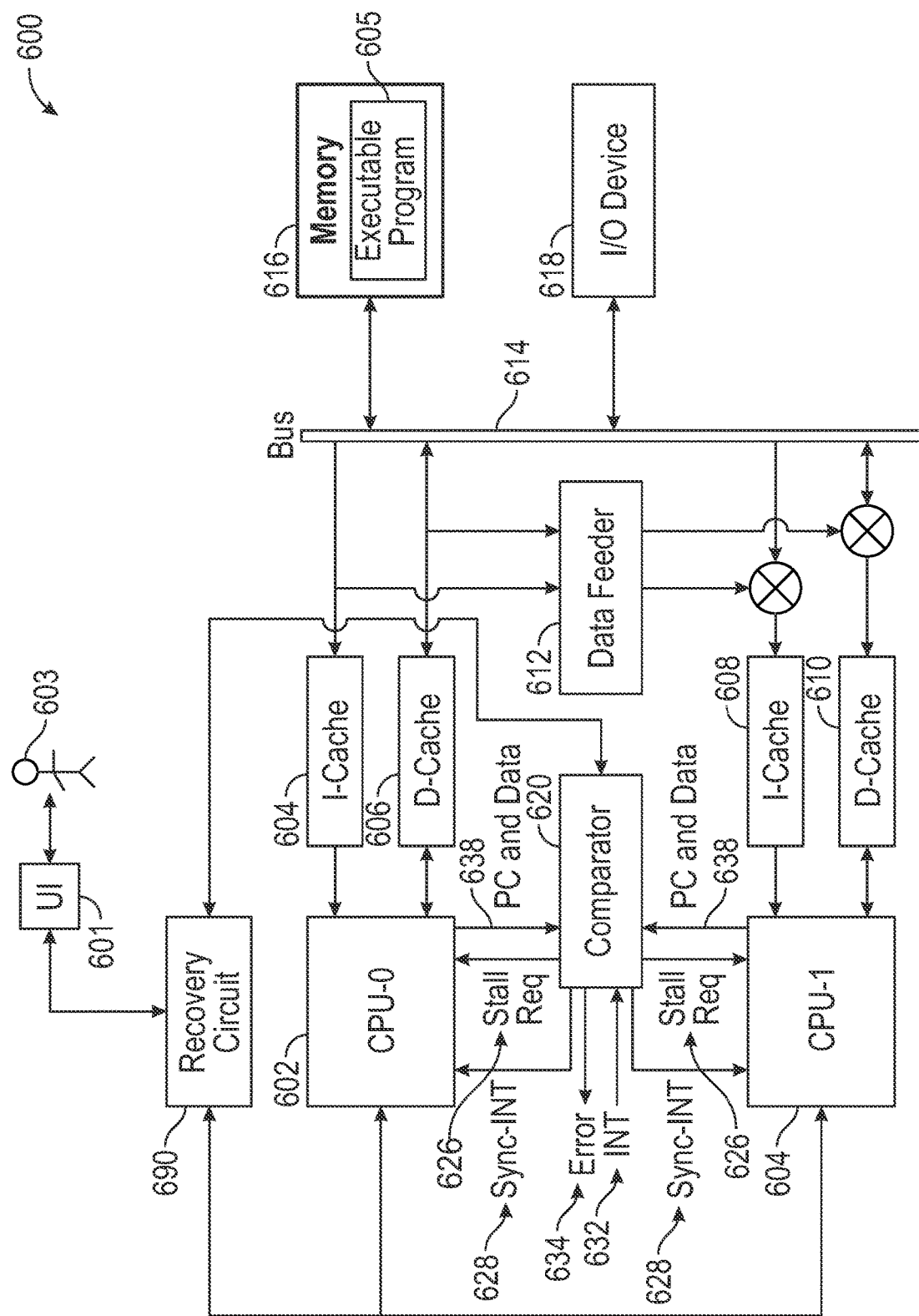
FIG. 6 is a simplified block diagram on another exemplary asymmetric DCLS system, showing a primary processor (CPU-0) and a secondary processor (CPU-1), consistent with some embodiments.

Referencing FIG. 6, a quasi-DCLS system 600 includes a primary processor 602 which is designated CPU-0 and a secondary processor 604 which is designated CPU-1. Both of the primary processor 602 and the secondary processor 604 execute the same program (e.g. executable code). The primary processor 602 and secondary processor 604 can be different types of processors as long as they have the same instruction set architecture (ISA). The secondary processor 604 is delayed relative to the primary processor 602, but the amount of the delay is not fixed. In some embodiments the amount of delay varies between one and two. In some embodiments, the amount of delay varies between is between one and four clock cycles. Because the amount of delay is not fixed, system 600 is referred to as a quasi-DCLS system.

Continuing with reference to FIG. 6, both primary processor 602 and secondary processor 604 are communicatively coupled with a comparator 620. In particular both primary processor 602 and secondary processor 604 are communicatively coupled to transmit a program counter (PC) and other data (collectively 638) to comparator 620 and to receive from comparator 620 signals, such as stall requirements 626 and sync-INT signals 628. The comparator 620 is configured to receive INT signals 632 (e.g. an external interrupt) and to send error signals 634. The INT signals 632 may be sent to comparator 620 because the primary processor 602 and the secondary processor 604 are out of synchronization. In response to receiving the INT signals 632, the comparator may send out synchronization interrupts (Sync-INTs 628) to the primary processor 602 and the secondary processor 604 to cause these two processors to synchronize about one or more execution points in the program.

Primary processor 602 is communicably coupled with an instruction cache (I-Cache) 604 and with a data cache (D-Cache) 606, are both communicably coupled with a bus 614 to send and receive communications. The instruction cache 604 and the data cache 606 are also communicably coupled to send instructions and data to a data feeder 612, which is discussed further below. Via the bus 614, the instruction cache 604 and data cache 606 are also communicably coupled with memory 616 (with executable program 605) and with input/output devices (I/O devices) 618.

Secondary processor is also communicably coupled an instruction cache (I-Cache) 608 and with a data cache (D-Cache) 610, are both communicably coupled with a bus 614 to send and receive communications. In particular, via the bus 614, the instruction cache 608 and data cache 610 are also communicably coupled with memory 616 and with input/output devices (I/O devices) 618.

The instruction cache 608 and the data cache 610 of secondary processor 604 are also communicably coupled to receive instructions and data from data feeder 612 which receives the instructions and data from instruction cache 604 and data cache 606 of primary processor 602. Thus, while operating in reliability mode, secondary processor 604 does not directly access memory 616 or I/O devices 618 for instructions and data.

When operational in reliability mode, the purpose of the data feeder 612 is to prevent double data loads and stores to the same location in memory 616 or to an input/output device 618. For example, it is undesirable to send store data twice to an input/output device such as a printer. The result may be that the printer prints twice. Thus, the data feeder 612 provides instructions and data to secondary processor 604 to prevent duplicate accesses to memory and input/output devices.

Figure 7:
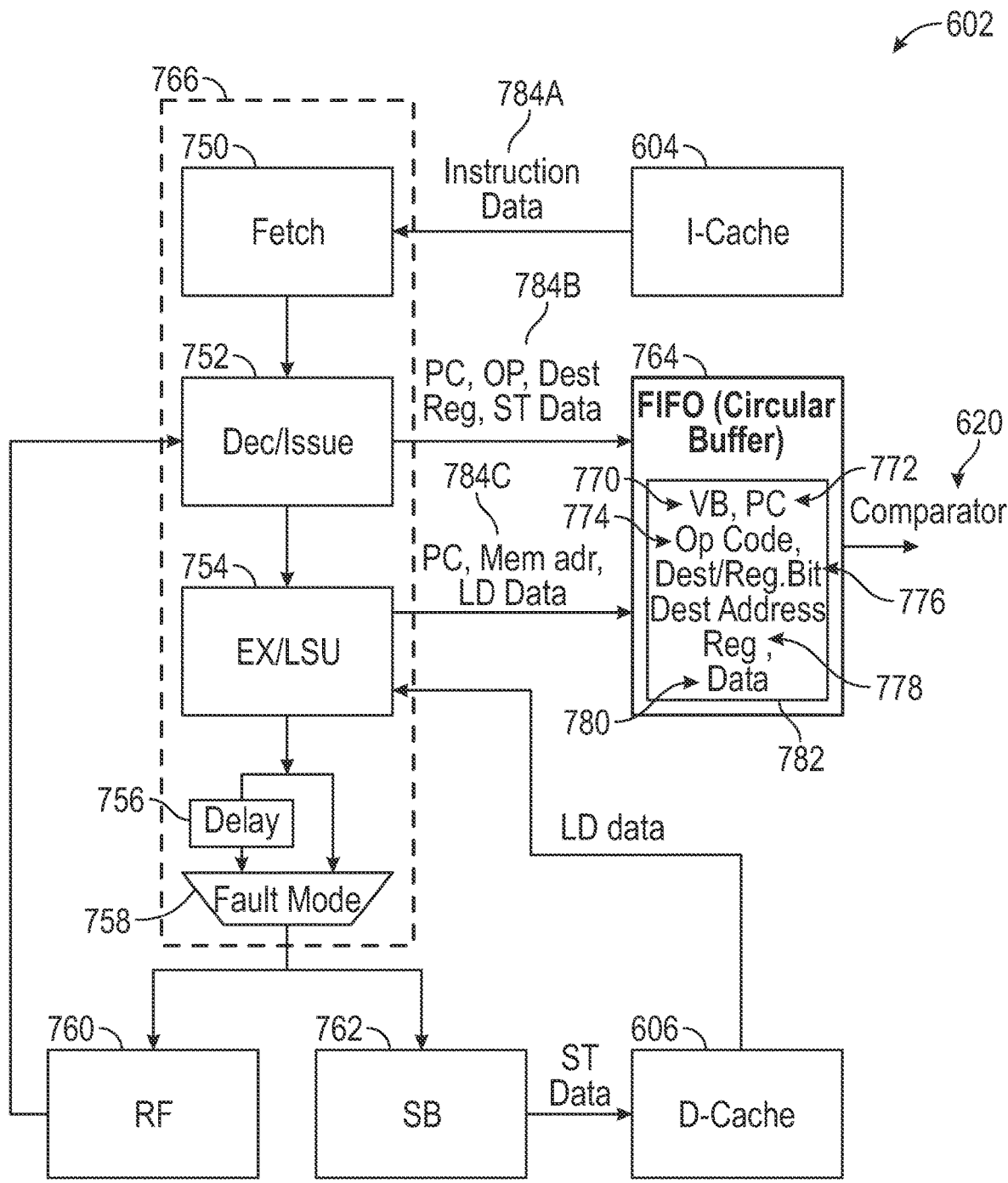
FIG. 7 is a more detailed block diagram of the primary processor of FIG. 6, consistent with some embodiments.

Referencing FIG. 7, primary processor 602 is described in further detail. Although, only primary processor 602 is described, the details for secondary processor would be the same except as indicated.

Primary processor 602 includes a pipeline 766 (simplified) that includes a fetch stage 750, a decode/issue stage 752, an execution/LSU stage 754 (refers to an execution stage with a load store unit). The pipeline 766 further includes a delay circuit 756 and a fault mode circuit 758 for a reliability mode. Embodiments implementing reliability mode are discussed above relative to FIGS. 1-4. Details of reliability mode will not be further discussed in reference to FIG. 7.

The output of Pipeline 766 is output to a register file (RF) 760 for a write-back operation or to a store buffer (SB) 762 for a store operation. Store data (ST data) that is output to store buffer 762 is further output to the data cache 606. Data cache 606 is further communicably coupled to send load data (LD) to the execution/LSU stage 754. Primary processor 602 further includes an instruction cache (I-cache) 604 that is communicably coupled with the fetch stage 750 for sending instruction data 784A to fetch stage.

Primary processor 602 further includes a first-in/first-out (FIFO) buffer in the form of circular buffer 764. Although this FIFO buffer is shown as a circular buffer, those of skill in the art will recognize that other buffers could be utilized as well (e.g. a last-in/first-out (LIFO) buffer). The decode/issue stage 752 transmits a program counter (PC) and other instruction data 784B to the circular buffer 764. In this implementation the other instruction data includes an opcode (OP), a destination register, and store data (ST data). However, certain data is not available to send to the circular buffer 764 until the next stage, the execution/LSU stage 754, such as a memory address for read or store operations and any load data from data cache 606. Thus, if applicable, the execution/LSU stage 754 transmits a PC (used to identify the instruction data) together with additional instruction data 784C, such as a memory address and some load data to the circular buffer 764. The secondary processor 604 also has a circular buffer that operates the same way unless indicated otherwise below.

Figure 8:
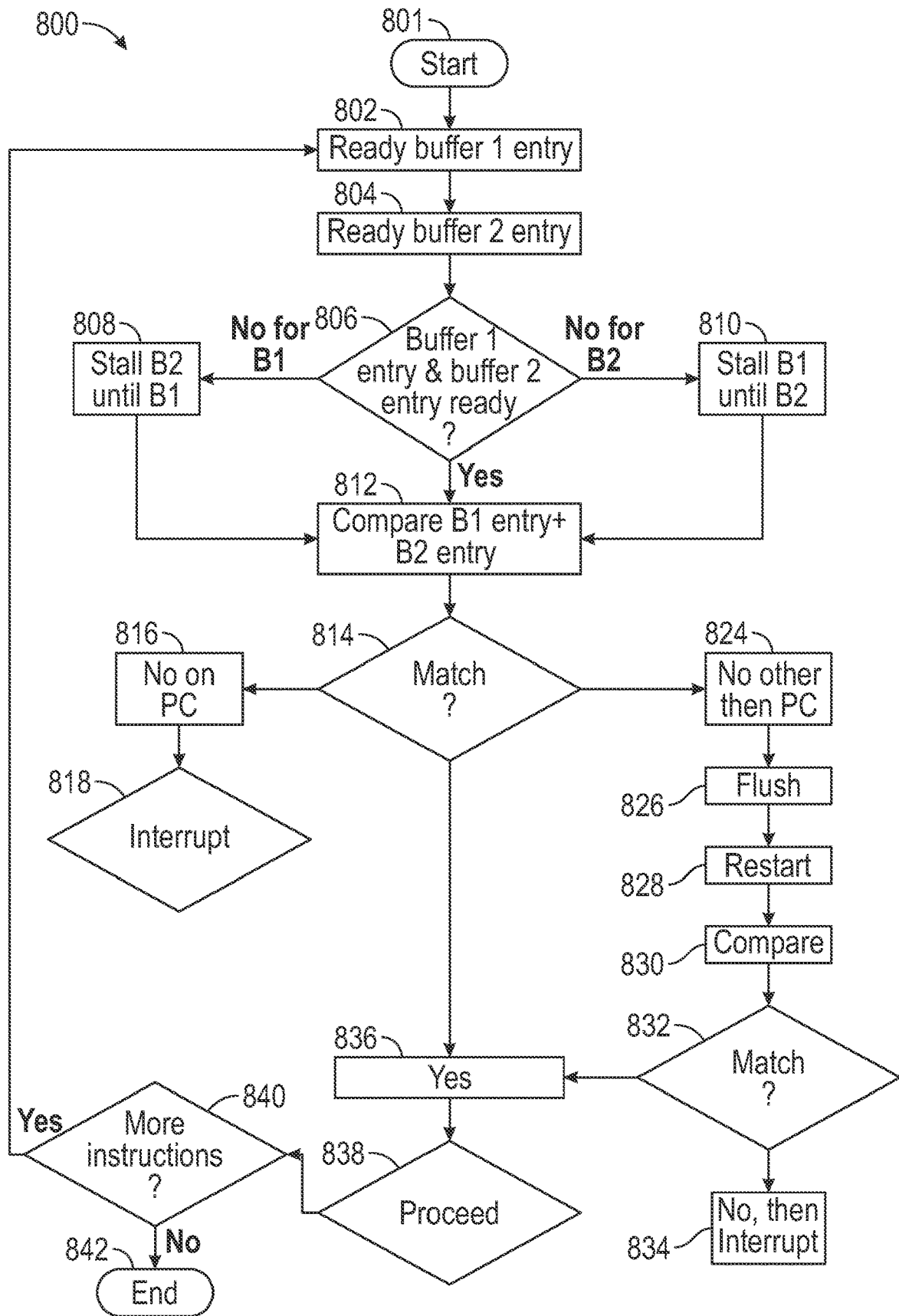
FIG. 8 is a method flow chart illustrating a method of synchronizing two processors, consistent with some embodiments.

Primary processor 602, secondary processor 604, and comparator 620 are each shown linked to recovery circuit 690, which in some embodiments contains instructions or logic for implementing exception routines (see, operations 818, 834 of FIG. 8). In some embodiments, recovery circuit is not a separate entity but its functions are distributed among one or more of primary processor 602, secondary processor 604, and/or comparator 620. In some embodiments, recovery circuit 690 is implemented, at least in part, as an interrupt handler. In some embodiments, recovery unit 690 includes or is coupled with a user interface (UI) 601 for sending output to and/or receiving input from a human user 603. In some embodiments, recovery circuit 690 is configured for recovering from at least one of faults (e.g. especially permanent faults) or failure of synchronization.

Again referencing FIG. 6, when reliability mode is on (e.g. when a reliability application is being executed in both processors), then comparator 620 and the data feeder 612 are active. As discussed above, the comparator is used to compare two hardware signals generated from an identical secure program executed on each of the primary processor 602 and the secondary processor 604.

The data feeder 612 is used to receive store data from the primary processor 602 (if it is reliable thread output) and further used to feed load data from bus 614 (data was load data for the primary processor 602). In addition, the data feeder 612 monitors address and control signals from the primary processor 602 and from the secondary processor 604. Without the data feeder 612, both processors might write data to memory 616 or to an I/O device, which may cause load stalled data due to an out-of-synchronization.

In addition, the data feeder 612 records reliability thread load and store data request from the primary processor. If there is a matching request from the secondary processor, the data feeder intervenes by providing the load data to the secondary processor and receives any store data from the secondary processor, all without sending any data on the bus. The data feeder thus only allows the primary processor to update memory or I/O devices. This prevents duplicate updates. Assuming memory or I/O devices are protected by ECC (error-correcting code) or parity, for fault or error detection.

Returning to reference FIG. 7, the primary processor 602 has a circular buffer 764 (e.g. a FIFO buffer) that stores instruction data entries 782 that include, in some embodiments, a validity bit (VB) 770, a program counter (PC) 772, an OP code 774, an address/register bit 776, a destination address register 778, and any data (e.g. operands) 780.

Instruction data is entered in an entry 782 when the corresponding instruction issues to the pipeline 766. Usually instructions issue to the pipeline 766 during the decode/issue stage 752. However, some data such as load data or destination register value is not available at the time of issuance. This unavailable data may be unavailable due to a data dependency and may become available later in the pipeline 766. This unavailable data is supplied to the circular buffer 764 at the time of availability. The previously unavailable data is supplied to the circular buffer 764 together with the associated PC, which acts as an identification.

For a given instruction, the associated instruction data is sent by each circular buffer to the comparator 620. The comparator 620 compares the two sets of instruction data (e.g. the instruction data sent by each circular buffer) to determine if there is a match. Architectural register values (ARF values) and store data for the store buffer are after a successful comparison, when there is match.

Some operational features of the primary processor 602 and the secondary processor 604 are now discussed.

One aspect is the handling of interrupts. If an interrupt comes, it will be granted just after the first comparison matches.

The delay between data cache 606 of the primary processor 602 and data cache 610 of the secondary processor 604 is reduced by the synchronization of the two processors by comparator 620. In some embodiments this synchronization is facilitated by employing non-blocking caches. For example, if a data-cache is a blocking cache, then during a block, cache access by other threads could be blocked and as a result an entire processor could be stalled. To avoid this case, non-blocking cache design is used.

In addition, while in reliability mode, a write through policy may be employed between the data caches and memory 616. That is, during data writing operations to the data caches 606, 610, the data caches make write-throughs to memory such that effectively, the data caches and memory are updated together. Without the write-through policy, it is difficult to synchronize the primary processor 602 and the secondary processor 604 because these processors are operating in a multi-threaded environment in which non-reliability applications are also being executed by the primary processor 602 and the secondary processor 604. For example, in the case in which each processor has 16 time slots (discussed above) with 4 time slots per application, each processor can also independently execute up to 3 non-reliability applications in addition to the reliability application. This creates scenarios that are difficult for synchronization, such as cache line victim eviction.

The data feeder 612 of FIG. 6 located between the caches (I-cache 604, D-cache 606, I-cache 608 and D-cache 610) and bus 614. However, in some alternative embodiments, Data feeder is located between the cores (primary core 602 and secondary core 604) and the above caches. In these alternative embodiments, DCLS implementation may be easier and there is no need for write-through policy. In addition, in these alternative embodiments, the primary processor and the secondary processor may have the same data cache, which speeds execution speed. However, in these alternative embodiments, the primary processor and the secondary processor are forced into closer proximity which may lead to a higher special fault probability after production. Ultimately, placement of the data feeder 612 is a design choice based on various factors, as discussed above.

It may be assumed incorrectly that only one hardware thread per processor is used to be part of a pair for reliability mode, However, reliability mode can be extended to encompass multiple hardware threads on a single processor, for example, if multiple reliable applications have to be executed in parallel. In some embodiments, this is accomplished by adding more comparators and data feeder.

In addition, as noted above, the quasi-DCLS technologies discussed above can be utilized using asymmetrical processor pairs, as long as the ISA is the same.

Referencing FIG. 8, a method 800 of synchronizing a primary processor and a secondary processor is disclosed. Method 800 applies to a primary processor with a circular buffer 1 and a secondary processor with a circular buffer 2. In method 800, the primary processor (or one or more relevant hardware threads) and the secondary processor (or one or more relevant hardware threads) are to execute the same computer program in reliability mode. Method 800 begins after reliability mode is set.

After a start operation 801, control moves to operation 802 which prepares an entry of circular buffer 1 (see, e.g. circular buffer 764) of the primary processor for a comparison operation. In operation 802, after entering reliability mode, a PC and other instruction set data (See, for example, FIG. 7, entry 782 and its elements) are copied to an entry in circular buffer 1.

The PC value stored in circular buffer 1 during the issue stage (e.g. DEC2 212A, ISSUE stage of FIG. 14A, DECODE stage of FIG. 14D, or other issue stage) and a PC value stored in the first delay circuit (e.g. primary processor store data delay circuit stage 1 336A) are matched. It is noted that the PC value is stored in the circular buffer 1 during the issue stage. However, the PC value also moves along the pipeline as the instruction moves down the pipeline. When PC value arrives at the first delay circuit (e.g. primary processor store data delay circuit stage 1 336A), then circular buffer 1 is searched to find the PC that was initially stored in circular buffer 1 for comparison. Upon a successful match, an entry of circular buffer 1 is ready for a comparison operation.

Control moves to operation 804 which prepares an entry (e.g. entry 782 of FIG. 7) of circular buffer 2 (see, e.g. circular buffer 764), associated with a secondary processor for a comparison operation. In operation 802, a PC and other instruction set data (See, for example, FIG. 7, entry 782 and its elements) are copied to an entry in circular buffer 2.

The PC value stored in circular buffer 2 during the issue stage (e.g. DEC2 212B) and a PC value stored in the secondary delay circuit (e.g. secondary processor store data delay circuit 386) are matched. It is noted that the PC value is stored in the circular buffer 2 during the issue stage. However, the PC value also moves along the pipeline as the instruction moves down the pipeline. When PC value arrives at the delay circuit (e.g. secondary processor store data delay circuit 386), then circular buffer 2 is searched to find the PC that was initially stored in circular buffer 2 for comparison. Upon a successful match, circular buffer 2 is ready.

Although operations 802 and 804 taking place sequentially with 801 occurring first, that order is not limiting. Operations 802 and 804 could take place in a reverse order, concurrently, or simultaneously.

After either operation 802 or operation 804 is completed, control moves to operation 806, which determines if the entries of both circular buffer 1 and circular buffer 2 are ready.

If the entry of circular buffer 2 is ready but the entry of circular buffer 1 is not ready, then operation 808 stalls the secondary processor (associated with circular buffer 2) until circular buffer 1 is ready. Once the entry of circular buffer 1 is ready, control moves to operation 812.

If the entry of circular buffer 1 is ready but the entry circular buffer 2 is not ready, then operation 810 stalls the primary processor (associated with circular buffer 1) until the entry of circular buffer 2 is ready. Once the entry of circular buffer 2 is ready, control moves to operation 812. Thus, if one entry in a circular buffer is ready to be compared but the corresponding entry in the entry of the other circular buffer is not yet ready to be compared, then a hold or stall signal is issued to the processor corresponding to the ready circular buffer. This stall or hold is only performed in reliability mode. Thus, threads not operating in reliability mode are not affected.

If the entries of both circular buffer 1 and circular buffer 2 are ready, control moves to operation 812.

Operation 812 performs a comparison to determine if the corresponding entries (e.g. associated with the same program counter) in circular buffer 1 and circular buffer 2 match. In some embodiments, each entry to be compared includes, a PC, an opcode, a destination register/address bit, a destination address register, and any data (e.g. operands). The outcomes include a match on all compared instruction data, a mismatch on the PC's, or a mismatch on elements other than the PC, such as for example a destination register value or a store data value.

A validity bit is part of each entry, but is not compared. The purpose of the validity bit is to assist with the flushing of the entries from the circular buffers. When an entry is copied to a circular buffer the validity bit is set to indicate validity. When it is desired to flush the entry from a circular buffer, it is not necessary to consume computing resources by erasing the entry. Instead, the validity bit is switched to indicate invalidity and the entry is treated as erased.

If the PC's do not match, in some embodiments control moves to operation 816 which jumps to an interrupt location (operation 818) and then wait command from higher system. The program is halted on both processors. If PC values do not match, then the program cannot be re-run cannot be done. Operation 818 may be operated by recovery circuit 690.

However, in some alternative embodiments, if the mismatch occurred because of mismatched PC values and the previous Opcode was a branch instruction, then under some circumstances a restart is possible from the branch instruction. The procedures of operations 824-832 would otherwise be applicable.

In other alternative embodiments, a PC value is recovered from by adding a sum to a previously matched PC. For example, the attempted recovery may utilize, as the PC value, a previously matched PC+2 or 4 (depending on previous instruction length). But if the previous instruction was a branch, then as indicated above, it is necessary to re-execute branch instruction itself. If the previous instruction was JALR (return instruction in RISCV) type of instruction and destination register can be updated again (when operand and destination are same). Thus, depending on the circumstances, a re-execution may not succeed and may be impossible.

If there is a mismatch on elements other than the PC (e.g. on data store value or destination value, etc.), then control moves to operation 824 which invokes recovery procedures:

a. Operation 826 flushes (e.g. cancels) all instructions in the processor pipelines and all entries in the circular buffers. In some embodiments, the entries in the circular buffers are flushed by setting their validity bits to invalid.

b. Operation 828 restarts the program on both processors. Execution starts with the instruction pointed to by the most recent matched PC in the circular buffers. More specifically, execution starts with the fetch stage fetching that instruction then proceeds to decode and so on.

c. During re-execution, operation 830 continues to compare corresponding entries (e.g. entries with the same PC) in circular buffer 1 and circular buffer 2.

d. Operation 832 determines if the corresponding entries in the circular buffers match.

e. If for a second time, there is a mismatch, control moves to operation 834 which invokes an interrupt, flushes the processor pipelines and the circular buffers and the waits for a command from a human or a higher system (e.g. recovery circuit 690, in some examples with UI 603 in communication with human 603). In some embodiments, operation 834 is performed at least partly by recovery circuit 690 which causes the processors to run any interrupt routine and, as a result, serves as or is a higher system.

f. If on re-execution, the entries match control moves to operation 836.

If there is a match of all compared instruction data, whether in operation 814 or in operation 832, then operation 836 causes the program to proceed to operation 840. And when there is a match, then both of the matching entries are removed from the circular buffer (e.g. by setting their validity bits to invalid).

Operation 840 determines, after the match, whether there are still instructions to be processed in the circular buffer. If yes, the control loops back to operations 802 and 804 to ready additional entries in circular buffer 1 and circular buffer 2. If no, control moves to end operation 842.

FIGS. 9-15 include various pipeline timing diagrams and circular buffer timing diagrams (showing operation of circular buffers). They will be summarized herein, but no attempt will be made to re-state every item in these pipeline timing diagrams. Instead, the reader is invited to review the pipeline timing diagrams.

Referencing FIGS. 9 and 10, pipeline timing diagrams 900 and 1000 are shown for, respectively, a 5-stage processor and a 7-stage dual thread processor. Shown are instructions being processed in and progressing through the pipelines of these processors. If these both have the same ISA, they could in some implementations be a processor pair for quasi-DCLS.

Referencing FIGS. 11A and 11B, a pair of pipeline timing diagrams 1100A and 1100B are shown for a primary processor (CPU-0) and a secondary processor (CPU-1) executing in reliability mode. Both are 5-stage processors. As can be seen, the primary processor CPU-0 has 3 delay stages (shown as Delay1, Delay2, Delay3) but the secondary processor CPU-1 has a single delay circuit. These 3 delay stages synchronize for a comparison with CPU-0 at the $3^{rd}$ delay stage because CPU-1 starts two clock cycles later than CPU-0 but has only 1 delay stage (shown as Delay 1). The operation of these delay stages is discussed in more detail relative to FIGS. 3A and 3B.

A compare/match operation is not shown at the end of the $3^{rd}$ delay for the primary processor and the $1^{st}$ delay for the secondary processor, but if there is no match the final write back (WB) stage is flushed (e.g. cancelled, invalidated). No synchronization of the primary processor and the secondary processor is indicated in FIGS. 11A and 11B.

Referencing FIGS. 12A and 12B, a pair of pipeline timing diagrams 1200A and 1200B are shown for a primary processor (CPU-0) and a secondary processor (CPU-1) executing in reliability mode. Both are 7-stage processors dual-threaded processors. As can be seen, the primary processor CPU-0 has 3 delay stages (shown as Delay 1, Delay2, Delay3) but the secondary processor CPU-1 has a single delay circuit. These 3 delay stages synchronize for a comparison with CPU-0 at the $3^{rd}$ delay stage because CPU-1 starts two clock cycles later than CPU-O but has only 1 delay stage (shown as Delay1). The operation of these delay stages is discussed in more detail relative to FIGS. 3A and 3B.

A compare/match operation is not shown at the end of the $3^{rd}$ delay for the primary processor and the $1^{st}$ delay for the secondary processor, but if there is no match the final write back (WB) stage is flushed (e.g. cancelled, invalidated). No synchronization of the primary processor and the secondary processor is indicated in FIGS. 11A and 11B.

Referencing FIGS. 13A and 13C, a pair of pipeline timing diagrams 1300A and 1300C are shown for a primary processor (CPU-0) and a secondary processor (CPU-1) executing in reliability mode. CPU-0 is a dual-threaded 7-stage processor and CPU-1 is single-threaded, 5-stage processor (or at least is only executing one thread). Thus, this is an example of reliability mode with asymmetric processors. There are two asymmetries. First, there is asymmetry in a dual-threaded processor versus single threaded processor. Second, there is asymmetry in a 7-stage processor versus 5-stage processor.

The above embodiment in which the primary processor is multi-threaded and the secondary processor is single-threaded is not intended to be limiting. In other embodiments, the primary processor may be single threaded and the secondary processor is multi-threaded. In yet other embodiments, both the primary processor and the secondary processor are single threaded or both the primary processor and the secondary processor are multi-threaded. All such scenarios are within the scope of this disclosure.

Returning to reference FIGS. 13A and 13C, as can be seen, the primary processor CPU-0 has 3 delay stages (shown as Delay1, Delay2, Delay3). That synchronizes a comparison with CPU-0 at the $3^{rd}$ delay stage because CPU-1 starts two clock cycles later than CPU-O but has only 1 delay stage (shown as Delay 1).

A compare/match operation is not shown at the end of the $3^{rd}$ delay for the primary processor and the $1^{st}$ delay for the secondary processor, but if there is no match the final write back (WB) stage is flushed (e.g. cancelled, invalidated). However, because the primary processor is dual-threaded and the secondary processor is not, the primary processor will move through the instructions at a faster rate than the secondary processor. The difference in the number of stages (7-stage versus 5-stage) would also cause lack of synchronization. This asymmetry results in the need for synchronization.

Referencing FIGS. 13B and 13D, timing diagrams 1300B and 1300D are shown for two circular buffers. In particular, FIG. 13B is a timing diagram for a buffer 1 that is associated with the primary processor of FIG. 13A. In addition, FIG. 13B is a timing diagram for a buffer 1 that is associated with the primary processor of FIG. 13A. The processing of instructions 1 and 2 in the primary processor circular buffer 1, the secondary processor and in circular buffer 2 is shown.

Preliminarily, in FIG. 13A, the pipeline timing diagram for the dual-threaded primary processor shows two threads being executed. The first thread has instructions INST 1, INST 2, INST 3 The second thread has instructions INST X1, INST X2, INST X3 . . . However, circular buffer 1 of FIG. 13B, only processes instructions for the first thread. That is, the circular buffers are each for one thread only. Additionally, in FIG. 13C, the pipeline timing diagram for the single-threaded secondary processor only shows the first thread being executed. That is it only shows instructions INST 1, INST 2, INST 3. Thus, the second thread is shown for context, but is not shown being processed in the circular buffers of FIGS. 13A, 13B.

Referencing specifically FIG. 13B, in clock cycle 4 the instruction data for instructions 1 and 2 for the primary processor are shown loaded onto circular buffer 1. The instruction data for instruction 1 is illustrative and includes a validity bit (V. Inst 1), an opcode (OP), a program counter (PC), and a destination, such as a destination register (DEST). The above types of instruction data are illustrative only and are not intended to be limiting. With different processors and/or a different program, other types of instruction data could be applicable.

Referencing both FIGS. 13A and 13B, the instruction data for instruction 1 is loaded into the circular buffer 1 in the 4th clock cycle because according to the pipeline timing diagram of FIG. 13A, the issuance stage is the $3^{rd}$ stage of the pipeline. Instruction data for an instruction is added to a circular buffer after the instruction issues. An examination of FIGS. 13A and 13B will show that this pattern holds for the other instructions. Continuing with instruction 1, it enters the delay 1 stage in clock cycle 7. At this time, the PC in the circular buffer 1 is compared with the PC in the pipeline or the primary processer at delay 1. If there is a match, in some embodiments, instruction 1 of circular buffer 1 and its instruction data are ready for comparison. Using the same approach, instruction 2 of circular buffer 1 and its instruction data are ready for comparison in clock cycle 7.

Referencing specifically FIG. 13D, the instruction data for the first instruction (instruction 1) for the secondary processor is added to the circular buffer 2 in clock cycle 5, but the instruction data for the second instruction (instruction 2) is not added until clock cycle 6. Referring to the pipeline timing diagram for the secondary processor in FIG. 13C, instruction 1 issues in clock cycle 4 at the end of the decode stage and instruction 2 issues in clock cycle 5, again at the end of the decode state. Again, the secondary processor is a single-threaded processor and therefore only issues one instruction at a time.

Referencing FIG. 13C, instruction 1 arrives at stage Delay 1 in clock cycle 7. At this time, the PC in the circular buffer 2 is compared with the PC in the pipeline of the secondary processer at delay 1. If there is a match, in some embodiments, instruction 1 of circular buffer 2 and its instruction data are ready for comparison. Using the same approach, instruction 2 of circular buffer 1 and its instruction data are ready for comparison in clock cycle 8.

Referencing both FIGS. 13B and 13D, the instruction data for instruction 1 is determined ready in both circular buffer 1 and circular buffer 2 in clock cycle 7, when the instruction data for instruction 1 is compared (indicated by bolding/ underlining of this instruction data in both buffers). A comparison of the instruction data for instruction 2 in buffer 1 with the instruction data for instruction 2 in buffer 2 is performed in clock cycle 8 (again indicated by bolding/ underlining of this instruction data in both buffers). The above illustrates how in the primary processor, because in this embodiment it is a dual issue processor, instruction 2 is ready at the same time as instruction 1 in clock cycle 7. But the secondary processor, in this embodiment, is single issue processor. Thus, the instruction 2 of the secondary processor is not ready until cycle 8.

In both cases, the comparison yields a match because otherwise, the operation of the circular buffers would have halted and they would have been flushed. The continued operation—as shown-indicates successful matching. Instructions 1 and 2 would then be removed from circular buffers 1 and 2, because their processing and comparison is complete.

Thus, FIGS. 13A-13D show an example of successful synchronization of two asymmetrical processors in which no mismatches or lack of synchronization are discovered.

Figures 14F, 15:
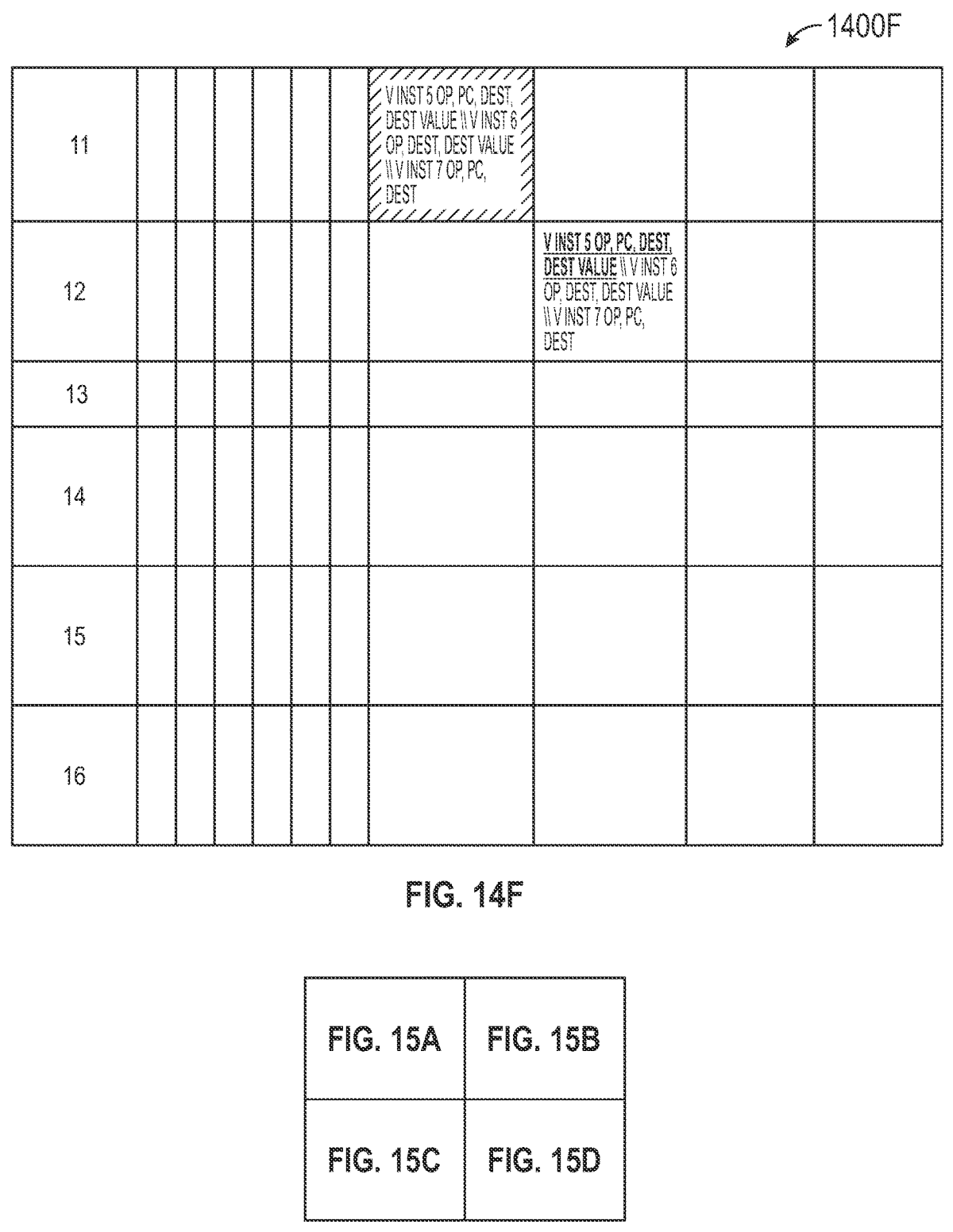

Referencing FIGS. 14A-14F, an example is shown of successful synchronization of two asymmetrical processors in which a lack of synchronization occurs and is successfully addressed. FIGS. 14A and 14D show pipeline timing diagrams 1400A and 1400B of a primary processor (CPU-0) and a secondary processor (CPU-1). Diagrams 1400B and 1400C of FIGS. 14B and 14C show the operation of circular buffer 1 associated with the primary processor, with FIG. 14B showing the operation during clock cycles 1-8 and FIG. 14C showing the operation during clock cycles 9-12. Diagrams 1400E and 1400F of FIGS. 14E and 14F show the operation of circular buffer 2 associated with the secondary processor, with FIG. 14B showing the operation of circular buffer 2 during clock cycles 1-10 and FIG. 14F showing the operation during clock cycles 11-12.

The operation of circular buffer 1 and circular buffer 2 in FIGS. 14A-14F (with diagrams 1400A-1400F) is similar to that of circular buffer 1 and circular buffer 2 in FIGS. 13A-13D, and therefore certain details will not be repeated. It is noted again, Referencing FIGS. 14A and 14D, that the primary processor is again a dual-threaded 7-stage processor and that the secondary processor is again a 5-stage single-threaded processor.

Preliminarily, in FIG. 14A, the pipeline timing diagram for the dual-threaded primary processor shows two threads being executed. The first thread has instructions INST 1, INST 2, INST 3 . . . . The second thread has instructions INST X1, INST X2, INST X3 . . . . However, circular buffer 1 of FIGS. 14B and 14C, only processes instructions for the first thread. That is, the circular buffers are each for one thread only. Additionally, in FIG. 14D, the pipeline timing diagram for the single-threaded secondary processor only shows the first thread being executed. That is it only shows instructions INST 1, INST 2, INST 3 Thus, the second thread is shown for context, but is not shown being processed in the circular buffers of FIGS. 14B, 14C.

Referencing FIGS. 14B, 14C, 14E, and 14F the operation of circular buffers 1 and 2 is successful through clock cycles-1-8. In clock cycle 7, instruction data related to the first instruction is compared and matched (as determined by the fact that operation of the circular buffers 1 and 2 continues). Similarly, in clock cycles 8-10, instruction data related to instructions 2-4 are compared and matched. For circular buffer 2, the operation in 9th clock cycle is shown in FIG. 14F.

However, clock cycle 11, circular buffer 1 attempts to compare instruction data for instructions 5, but the entry for the primary processor ("V inst5 OP, PC, dest") is not ready. The following procedures are consistent with the discussion relative to operation 808 of FIG. 8. Thus, in FIG. 14D, a stall command temporarily stalls the pipeline of the secondary processor to allow the primary processor to catch up. With the stall, the two pipelines are once again synchronized. And referencing FIGS. 14C and 14F, on the 12th clock cycle, after the stall is lifted, the instruction data for instruction 5 is compared and matched. The synchronization issue having been addressed, the operation of the pipelines and of circular buffer 1 and of circular buffer 2 continues. The above description of the recovery of synchronization is consistent with operations 802, 804, 806, 808, and 810 of FIG. 8.

Referencing FIGS. 15A-15D, a mismatch and the recovery from a mismatch are shown. FIGS. 15A and 15C show pipeline timing diagrams 1500A and 1500C of a primary processor (CPU-0) and a secondary processor (CPU-1). Diagram 1500B of FIG. 15B shows the operation of circular buffer 1 associated with the primary processor. Diagram 1500D of FIG. 15D shows the operation of circular buffer 2 associated with the secondary processor.

The operation of circular buffer 1 and circular buffer 2 in FIGS. 15A-15D is similar to that of circular buffer 1 and circular buffer 2 in FIGS. 13A-13D, and therefore certain details will not be repeated. It is noted again, referencing FIGS. 15A and 15C, that the primary processor (CPU-0) is again a dual-threaded 7-stage processor and that the secondary processor (CPU-1) is again a single-threaded 5-stage processor.

Preliminarily, in FIG. 15A, the pipeline timing diagram for the dual-threaded primary processor shows two threads being executed. The first thread has instructions INST 1, INST 2, INST 3 The second thread has instructions INST X1, INST X2, INST X3. However, circular buffer 1 of FIG. 15B only processes instructions for the first thread. That is, the circular buffers are each for one thread only. Additionally, in FIG. 15C, the pipeline timing diagram for the single-threaded secondary processor only shows the first thread being executed. That is it only shows instructions INST 1, INST 2, INST 3 . . . . Thus, the second thread is shown for context, but is not shown being processed in the circular buffers of FIGS. 14B, 14C. However, the second thread is discussed below in the context of a recovery from a mismatch in an entry in the circular buffers.

Referencing FIGS. 15B and 15D the operation of circular buffers 1 and 2 is successful through clock cycles-1-7. However, in clock cycle 8 a compare of instruction data for instruction 2 generates a mismatch. The recovery from this mismatch has several aspects that are discussed below.

A first aspect is that the mismatch on the instruction data for instruction 2 does not affect either instruction 1 or instruction data for instruction 1. At the time of this mismatch, the instruction data for instruction 1 had already been successfully compared and matched. And because of this, at the time of the mismatch, the instruction data for instruction 1 had already been flushed from the circular buffers. That is, the processing of instruction data related to instruction 1 had already been completed in the circular buffers and therefore is not affected by the mismatch. In addition, despite the mismatch in clock cycle 8, instruction 1 is not flushed from the primary processor and is allowed to finish in the write back (WB) stage in clock cycle 10.

A second aspect is that responsive to the mismatch, all instruction data in the circular buffers is flushed. For example, in FIG. 15B circular buffer 1 shows no instruction data between clock cycle 8 and clock cycle 14, when circular buffer 1 again receives new instruction data. Similarly, in FIG. 15D, circular buffer 2 shows no instruction data between clock cycle 8 and clock cycle 12, when circular buffer 2 again receives new instruction data.

A third aspect is that all instructions in the first thread are flushed from the primary processor and all instructions are flushed from the secondary processor.

A fourth aspect is that re-execution of the first thread begins in the fetch stage with the instruction pointed to by the program counter for the second instruction. In the primary thread, instruction 1 is allowed to complete in the write-back stage in clock cycle 11. Then, in clock cycle 12, instruction 2 enters the fetch stage. Meanwhile, between clock cycle 8 and clock cycle 12, thread 2 is still executing. Instruction data for instruction 2 is again entered into circular buffer 1 in clock cycle 14.

In the secondary thread, at the time of the mismatch in clock cycle 8, instruction 1 is in the final stage—the writeback stage. Instruction 1 is therefore completed in clock cycle 8. Then, in clock cycle 10, instruction 2 again enters the fetch stage. Instruction data for instruction 2 is again entered into circular buffer 2 in clock cycle 12.

Some embodiments are now discussed.

Embodiment 1: In some embodiments, a computing system comprises:

a primary processor (e.g. 602) configured to execute at least a plurality of executable instructions (e.g. 605) and to generate first instruction data (e.g. 784A, 784B, and/or 784C) associated with plurality of executable instructions;

a secondary processor (e.g. 604) configured to execute at least the plurality of executable instructions (e.g. 605) one or more clock cycles (See, e.g. clock cycles for secondary processor CPU-0 in FIG. 12B) behind the primary processor and to generate secondary instruction data (e.g. 784A, 784B, and/or 784C) associated with the plurality of executable instructions;

a first first-in first-out (FIFO) buffer (see e.g. FIFO circular buffer 764 and FIG. 13A showing exemplary contents of circular buffer for primary processor CPU-0) associated with the primary processor;

a second FIFO buffer (see e.g. FIFO circular buffer 764 and FIG. 13C showing exemplary contents of circular buffer for secondary processor CPU-1) associated with the secondary processor;

circuitry (e.g. primary processor 602 and/or secondary processor 604 implementing method 800) configured for storing some of the first instruction data in the first FIFO buffer for storing at least some of the second instruction data in the first FIFO buffer;

compare circuitry (e.g. comparator 620) configured for comparing at least a first portion of the first instruction data that is associated with a given clock cycle with at least a second portion of the second instruction data associated with the given clock cycle; and control circuitry (e.g. primary processor 602 and/or secondary processor 604 implementing method 800) configured for causing the primary processor and the second processor to at least temporarily halt execution of the plurality of executable instructions responsive to the compare circuitry determining a mismatch between the first portion and the second portion.

Embodiment 2: The computing system of embodiment 1, wherein the control circuitry is further configured to allow execution of at least an additional executable instruction of the plurality of executable instructions by the primary processor and by the secondary processor responsive to the compare circuitry determining a match between the first portion an the second portion.

Embodiment 3: The computing system of embodiment 2, wherein:

the compare circuitry (e.g. comparator 620) is further configured for comparing at least a third portion of the first instruction data that is associated with another given clock cycle with at least a fourth portion of the second instruction data associated with the another given clock cycle; and the control circuitry (e.g. primary processor 602 and/or secondary processor 604 implementing method 800) is further configured for causing the primary processor and the second processor to at least temporarily halt execution of the plurality of executable instructions responsive to the compare circuitry determining a mismatch between the third portion and the fourth portion.

Embodiment 4: The computing system of embodiment 3, wherein the control circuitry is further configured to allow execution of at least another additional executable instruction of the plurality of executable instructions by the primary processor and by the secondary processor responsive to the compare circuitry determining a match between the third portion an the fourth portion.

Embodiment 5: The computing system of any of embodiments 1-4, wherein:

the first processor is at least one of (a) a multi-threaded processor with a plurality of hardware threads or (b) a single-threaded processor; and the second processor is at least one of (a) a multi-thread processor with a plurality of hardware threads or (b) a single-threaded processor.

Embodiment 6. The computing system of any of embodiments 1-5, wherein:

the primary processor further comprises two or more primary processor delay buffers, including at least one final primary processor delay buffer that is last in a sequence of at least some of the two or more primary processor delay stages; and the secondary processor further comprises one or more secondary processor delay buffers;

wherein the computing system further comprises:

comparator circuitry configured for determining if there is a match between one or more first data values from the at least one final primary processor delay buffer and one or more second data values from the one or more secondary processor delay buffers, the lack of a match being indicative of a fault.

Embodiment 7: The computing system of any of embodiments 1-6, wherein the primary processor has a first number of pipeline stages (e.g. 7 pipeline stages) and the secondary processor has a second number of pipeline stages (.g. 5 pipeline stages), the first number and the second number being different numbers (See, e.g. FIGS. 13A, 13B).

Embodiment 8: The computing system of any of embodiments 1-7, wherein the secondary processor is configured to execute the plurality of executable instructions a variable number of clock cycles behind the primary processor.

Embodiment 9: The computing system of any of embodiments 1-8, wherein the first FIFO buffer is a first circular buffer and the second FIFO buffer is a second circular buffer.

Embodiment 10: The computing system of any of embodiments 1-9, wherein:

the first portion of the first instruction data that is associated with a given clock cycle comprises a first portion of the first instruction data associated with one or more executable instructions of the plurality of executable instructions and with the given clock cycle; and the second portion of the second instruction data that is associated with a given clock cycle comprises a second portion of the second instruction data associated with one or more executable instructions of the plurality of executable instructions and with the given clock cycle.

Embodiment 11: The computing system of embodiment 10, wherein:

the first portion of the first instruction data associated with one or more executable instructions of the plurality of executable instructions and with the given clock cycle comprises at least one of a validity bit, a program counter, an opcode, a destination/register bit, a destination register, or operand data; and the second portion of the second instruction data associated with one or more executable instructions of the plurality of executable instructions and with the given clock cycle comprises at least one of a validity bit, a program counter, an opcode, a destination/register bit, a destination register, or operand data.

Embodiment 12: The computing system of any of embodiments 10 or 11, wherein the compare circuitry configured to compare at least a first portion of the first instruction data that is associated with a given clock cycle with at least a second portion of the second instruction data associated with the given clock cycle comprises:

compare circuitry configured to compare the first portion of the first instruction data associated with one or more executable instructions of the plurality of executable instructions and with the given clock cycle with the second portion of the second instruction data associated with one or more executable instructions of the plurality of executable instructions and with the given clock cycle.

Embodiment 13: The computing system of any of embodiments 1-12, wherein the control circuitry includes at least one of the primary processor, the secondary processor, the first FIFO buffer, or the second FIFO buffer.

Embodiment 14: The computing system of any of embodiments 1-13, wherein the control circuitry is further configured to determine that the mismatch was not caused by a mismatch associated with one or more program counters, and responsive to the determination that the mismatch was not caused by a mismatch associated with one or more program counters to cause:

a flushing of at least some of the first instruction data from the first FIFO buffer and of at least some of the second instruction data from the second FIFO buffer;

a flushing of one or more instructions of the plurality of executable instructions from the primary processor and of one or more instructions from the secondary processor; and a re-execution of at least a portion of the plurality of executable instructions by both the primary processor and the secondary processor, the re-execution in both the primary processor and the secondary processor to begin with the fetching of an instruction pointed to by a program counter associated with associated with a most recent match by comparator (See, e.g. FIGS. 15A-15D).

Embodiment 15: The computing system of embodiment 14, wherein the control circuitry is further configured to cause, further responsive to the determination that the mismatch was not caused by a mismatch associated with one or more program counters:

a second comparison of the at least the first portion of the first instruction with at least the second portion of the second instruction data; and responsive to a second mismatch:

a. (a) to cause the primary processor and the second processor to at least temporarily halt execution of the plurality of executable instructions; and b. (b) to invoke an interrupt (e.g. invoke recovery circuit 690).

Embodiment 16. The computing system of any of embodiments 14-15, wherein the control circuitry is further configured to responsive to a match associated with the second comparison, to at least continue the re-execution.

Embodiment 17. The computing system of any of embodiments 1-16, wherein the control circuitry is further configured to determine that the mismatch was caused by a mismatch associated with one or more program counters, and responsive to the determination that the mismatch was caused by a mismatch associated with one or more program counters to:
  (a) cause the primary processor and the second processor to at least temporarily halt execution of the plurality of executable instructions; and
  (b) cause invocation of an interrupt (e.g. by recovery circuit 690).

Embodiment 18: The computing system of any of embodiments 1-17, wherein the circuitry configured for storing some of the first instruction data in the first FIFO buffer for storing at least some of the second instruction data in the first FIFO buffer comprises:
  circuitry configured for determining if the first instruction data stored in the first FIFO buffer is ready for comparison by compare circuitry;
  circuitry configured for determining if the second instruction data stored in the second FIFO buffer is ready for comparison by compare circuitry;
  circuitry for issuing one or more stall signals to the secondary processor if the second instruction data is ready and the first instruction data is not ready; and
  circuitry for issuing one or more stall signals to the primary processor if the first instruction data is ready and the second instruction data is not ready.

Embodiment 19. In some embodiments a computational method comprises:
  with a primary processor executing at least a plurality of executable instructions,
  the executing including at least generating first instruction data associated with plurality of executable instructions;
  with a secondary processor executing at least the plurality of executable instructions one or more clock cycles behind the primary processor, the executing including at least generating secondary instruction data associated with the plurality of executable instructions;
  storing some of the first instruction data in the first FIFO buffer;
  storing at least some of the second instruction data in the first FIFO buffer;
  comparing at least a first portion of the first instruction data that is associated with a given clock cycle with at least a second portion of the second instruction data associated with the given clock cycle; and
  at least temporarily halting execution of the plurality of executable instructions by the primary processor and by the second processor responsive to a mismatch between the first portion and the second portion.

Embodiment 20: In some embodiments a computing system comprises:
  a primary processor configured to execute at least a plurality of executable instructions and to generate first instruction data associated with plurality of executable instructions;
  a secondary processor configured to execute at least the plurality of executable instructions one or more clock cycles behind the primary processor and to generate secondary instruction data associated with the plurality of executable instructions;
  a first first-in first-out (FIFO) buffer associated with the primary processor;
  a second FIFO buffer associated with the secondary processor;
  circuitry configured for storing some of the first instruction data in the first FIFO buffer for storing at least some of the second instruction data in the first FIFO buffer;
  compare circuitry configured for comparing at least a first portion of the first instruction data that is associated with a given clock cycle with at least a second portion of the second instruction data associated with the given clock cycle; and
  control circuitry configured for at least one of:
    (1) causing the primary processor and the second processor to at least temporarily halt execution of the plurality of executable instructions responsive to the compare circuitry determining a mismatch between the first portion and the second portion; or
    (2) allowing execution of at least an additional executable instruction of the plurality of executable instructions by the primary processor and by the secondary processor responsive to the compare circuitry determining a match between the first portion an the second portion.

It will be understood by those skilled in the art that the terminology used in this specification and in the claims is "open" in the sense that the terminology is open to additional elements not enumerated. For example, the word "includes" should be interpreted to mean "including at least" and so on. Even if "includes at least" is used sometimes and "includes" is used other times, the meaning is the same: includes at least. The word "comprises" is also "open" regardless of where in a claim it is used. In addition, articles such as "a" or "the" should be interpreted as not referring to a specific number, such as one, unless explicitly indicated. At times a convention of "at least one of A, B, or C" is used, the intent is that this language includes any combination of A, B, C, including, without limitation, any of A alone, B alone, C alone, A and B, B and C, A and C, all of A, B, and C or any combination of the foregoing, such as for example AABBC, or ABBBCC. The same is indicated by the conventions "one of more of A, B, or C" and "and/or".

Elements, components, or operations should not be regarded as essential unless they are so explicitly described. The teachings contained herein may be adapted to a variety of embodiments arranged and composed in a wide variety of ways.

The above description of various embodiments is intended to be illustrative not exhaustive and is not intended to limit this disclosure, its application, or uses. Those skilled in the art will be able to imagine embodiments not described but that are consistent with the principles and teachings described herein. Therefore, the above description of exemplary embodiments is not intended to limit the scope of this disclosure, which should be defined only in accordance with the following claims and equivalents thereof.

We claim:
1. A computational system comprising:
(a) a primary processor configured to execute executable code, including updating at least one of a first register file (first ARF) or a memory, the primary processor including at least:
  (i) two or more primary processor delay buffers, including at least one final primary processor delay buffer that is last in a sequence of at least some of the two or more primary processor delay buffers; and
  (ii) one or more primary processor historical storage buffers communicatively coupled with the at least one final primary processor delay buffer;
(b) a secondary processor configured to execute the executable code one or more clock cycles behind the primary processor, including at least updating at least one of a second register file (second ARF) or the memory, the secondary processor including at least:
  (i) one or more secondary processor delay buffers; and
  (ii) one or more secondary processor historical storage buffers communicatively coupled with the one or more secondary processor delay buffers; and
(c) comparator circuitry configured for determining if there is a match between one or more first data values from the at least one final primary processor delay buffer and one or more second data values from the one or more secondary processor delay buffers, the lack of a match being indicative of a fault; and
(d) wherein, responsive to a fault, the primary processor is configured to store the one or more first data values in the one or more primary processor historical storage buffers and the secondary processor is configured to store the one or more second data values in the one or more secondary processor historical storage buffers.

2. The computational system of claim 1, wherein the primary processor and the secondary processor are architecturally identical.

3. The computational system of claim 1, wherein the executable code is at least a portion of a computer program.

4. The computational system of claim 1, wherein:
the two or more primary processor delay buffers include at least two or more primary processor store data delay buffers positioned in a pipeline of the primary processor before a store-to-memory operation and at least two or more primary processor delay buffers positioned in the pipeline before a write-back to the first ARF, the two or more primary processor store data delay buffers including at least a primary processor store data final delay buffer and the two or more primary processor write-back delay buffers including at least a primary processor write-back final delay buffer; and
the one or more primary processor historical storage buffers include at least (1) a primary processor store data historical storage buffer communicatively coupled with a store data final primary processor delay buffer and (2) at least a primary processor write-back historical storage buffer communicatively coupled with a final primary processor write-back delay buffer.

5. The computational system of claim 4, wherein:
the one or more secondary processor delay buffers include at least a secondary processor store data delay buffer positioned in a pipeline of the secondary processor before a store-to-memory operation and at least a secondary processor write-back delay buffer positioned in the pipeline before a write-back to second ARF; and
the one or more secondary processor historical storage buffers include at least a secondary processor store data historical storage buffer communicatively coupled with the secondary processor store data delay buffer and at least a secondary processor write-back historical storage buffer communicatively coupled with the secondary processor write-back delay buffer.

6. The computational system of claim 5, wherein at least one comparator circuit of the comparator circuitry includes at least:
a store data comparator circuit is configured to determine a match between one or more first store-data data values associated with the primary processor store data final delay buffer and one or more second store-data data values associated with the secondary processor store data delay buffer; and
a write-back comparator circuit is configured to determine a match between one or more first write-back data values associated with the primary processor write-back final delay buffer and one or more second write-back data values associated with the secondary processor write-back delay buffer.

7. The computational system of claim 6, wherein:
responsive to a detection of a fault by the store data comparator circuit, the primary processor is configured to store the one or more first store-data data values in the primary processor store data historical storage buffer and the secondary processor is configured to store the one or more second store-data data values in the secondary processor store data historical storage buffer; and
responsive to a detection of a fault by the write-back comparator circuit, the primary processor is configured to store the one or more first write-back data values in the primary processor write-back historical storage buffer and the secondary processor is configured to store the one or more second write-back data values in the secondary processor write-back historical storage buffer.

8. The computational system of claim 7, wherein, responsive to the detected fault, the primary processor and the secondary processor are configured to re-execute at least a portion of executable code, the re-execution beginning with the fetching an instruction pointed to by a program counter associated with the fault.

9. The computational system of claim 1, wherein the comparator circuitry is configured to determine if there is a match between the one or more first data values and the one or more second data values before the primary processor updates at least one of the memory or the first ARF and before the secondary processor updates at least one of the memory or the second ARF; and
wherein, responsive to the comparator circuitry not finding a match between the one or more first data values and the one or more second data values, the primary processor is configured to prevent at least one of the memory update or the first ARF update and the secondary processor is configured to prevent at least one of the memory update or the second ARF update.

10. The computational system of claim 9, wherein comparator circuitry is configured to determine if there is a match between the one or more first data values with the one or more second data values before a memory update by the primary processor and before a memory update by the secondary processor.

11. The computational system of claim 9, wherein the comparator circuitry is configured to determine if there is a match between the one or more first data values with the one or more second data values before a write-back to first ARF by the primary processor and before a write-back to the second ARF by the secondary processor.

12. The computational system of claim 9, wherein, responsive to the comparator circuitry finding a match between the one or more first data values and the one or more second data values, the primary processor is configured to perform at least one of the memory update or the first ARF update and the secondary processor is configured to perform at least one of the memory update or the second ARF update.

13. The computational system of claim 1, wherein, the primary processor, further responsive to the fault, is configured to flush one or more pipeline instructions and to re-execute at least a portion of executable code, the re-execution beginning with the fetching an instruction pointed to by a program counter associated with the fault; and
    wherein the secondary processor, further responsive to the fault, is configured to flush one or more pipeline instructions and to re-execute at least the portion of the executable code, the re-execution beginning with the fetching of an instruction pointed to by a program counter associated with the fault.

14. The computational system of claim 13, wherein the comparator circuitry is further configured, responsive to the re-execution reaching a part of the re-execution associated with the fault, to perform a second determination of a match between one or more third data values from the at least one final primary processor delay buffer and one or more fourth data values from the one or more secondary processor delay buffers.

15. The computational system of claim 14, wherein the primary processor is configured, responsive to a second fault, to copy the one or more first data values from the one or more primary processor historical storage buffers to at least one primary processor second stage historical storage buffer and wherein the secondary processor is configured, responsive to the second fault, to copy the one or more second data values from the one or more secondary processor historical storage buffers to at least one secondary processor second stage historical storage buffer.

16. The computational system of claim 15, wherein the primary processor is further configured, responsive to the second fault, to store the one or more third data values into the one or more primary processor historical storage buffers and wherein the secondary processor is further configured, responsive to the second fault, to store the one or more fourth data values into the one or more secondary processor historical storage buffers.

17. The computational system of claim 16, wherein at least one of the primary processor or the secondary processor is configured, responsive to the second fault, to invoke an exception handler to respond to a permanent fault, the exception handler configured to report the permanent fault to at least one of human or a higher process and to provide the at least one of the human or the higher process with at least one of the one or more first data values, the one or more second data values, the one or more third data values, or the one or more fourth data values.

18. The computational system of claim 14, wherein the primary processor is configured responsive to the second determination of a match to continue the re-execution of the portion of the executable code and wherein the secondary processor is configured responsive to the second determination resulting in a match to continue the re-execution of the portion of the executable code.

19. A computational method comprising:
    (a) with a primary processor, executing executable code, including at least updating at least one of a first register file or a memory;
    (b) with a secondary processor, executing the executable code one or more clock cycles behind the primary processor, including at least updating at least one of a second register file or the memory;
    (c) determining if there is a match between one or more first data values from at least one primary processor final delay buffer of a plurality of sequential primary processor delay buffers and one or more second data values from one or more secondary processor delay buffers, the lack of a match being indicative of a fault; and
    (d) storing, responsive to the fault, the one or more first data values in at least one primary processor historical storage buffer and the one or more second data values in at least one secondary processor historical storage buffer.

20. A computational system comprising:
    (a) a primary processor configured to execute executable code, including at least updating at least one of a first register file (first ARF) or a memory, the primary processor including at least:
        (i) two or more primary processor delay buffers, including at least one final primary processor delay buffer that is last in a sequence of at least some of the two or more primary processor delay buffers; and
        (ii) one or more primary processor historical storage buffers communicatively coupled with the at least one final primary processor delay buffer;
    (b) a secondary processor configured to execute the executable code one or more clock cycles behind the primary processor, including at least updating at least one of a second register file (second ARF) or the memory, the secondary processor including at least:
        (i) one or more secondary processor delay buffers; and
        (ii) one or more secondary processor historical storage buffers communicatively coupled with the one or more secondary processor delay buffers; and
    (c) comparator circuitry configured for determining if there is a match between one or more first data values from the at least one final primary processor delay buffer and one or more second data values from the one or more secondary processor delay buffers, the lack of a match being indicative of a fault; and
    (d) wherein, responsive to the fault, the primary processor is configured to store the one or more first data values in the one or more primary processor historical storage buffers and the secondary processor is configured to store the one or more second data values in the one or more secondary processor historical storage buffers; and
    wherein the primary processor and the secondary processor are architecturally identical.

\* \* \* \* \*